(12) United States Patent
Brufau Redondo et al.

(10) Patent No.: US 9,789,673 B2
(45) Date of Patent: Oct. 17, 2017

(54) SYSTEM FOR FORMING STACKS OF COMPOSITE MATERIALS

(71) Applicant: Applus Servicios Tecnologicos, S.L., Barcelona (ES)

(72) Inventors: Jordi Brufau Redondo, Barcelona (ES); Antoni Solá Lorente, Barcelona (ES)

(73) Assignee: Applus Servicios Tecnologicos, S.L., Barcelona (ES)

( * ) Notice: Subject to any disclaimer, the term of this patent is extended or adjusted under 35 U.S.C. 154(b) by 73 days.

(21) Appl. No.: 14/356,035

(22) PCT Filed: Sep. 21, 2012

(86) PCT No.: PCT/EP2012/068642
§ 371 (c)(1),
(2) Date: May 2, 2014

(87) PCT Pub. No.: WO2013/064309
PCT Pub. Date: May 10, 2013

(65) Prior Publication Data
US 2014/0290866 A1    Oct. 2, 2014

(30) Foreign Application Priority Data
Nov. 3, 2011  (WO) .................. PCT/EP2011/069330

(51) Int. Cl.
*B32B 37/10*     (2006.01)
*B29C 70/38*     (2006.01)
(Continued)

(52) U.S. Cl.
CPC ............ *B32B 37/10* (2013.01); *B29C 70/386* (2013.01); *B29C 70/388* (2013.01);
(Continued)

(58) Field of Classification Search
CPC ... Y10T 156/14; B29C 70/388; B29C 70/504; B29C 70/386; B29D 99/0003; B29D 99/0007; B32B 37/10
See application file for complete search history.

(56) References Cited

U.S. PATENT DOCUMENTS

| 4,503,642 A | 3/1985 | Wilms |
| 7,249,943 B2 | 7/2007 | Benson et al. |
| 2011/0247751 A1 | 10/2011 | Steyer et al. |

FOREIGN PATENT DOCUMENTS

GB        1459105 A     12/1976

OTHER PUBLICATIONS

Dykes, R. J. et al. "Roll forming continuous fibre-reinforced thermoplastic sheets: experimental analysis." Composites Part A: Applied Science and Manufacturing, Elsevier Science Publishers B.V., Amsterdam, NL, vol. 31, No. 12, Dec. 2000, pp. 1395-1407.

*Primary Examiner* — Vishal I Patel
(74) *Attorney, Agent, or Firm* — Locke Lord LLP; Nicholas J. DiCeglie, Jr.; Daniel J. Fiorello

(57) ABSTRACT

The invention relates to a system for shaping laminar composite materials, comprising a base (1) with at least one longitudinal mandrel element (2) comprising a shape to be given to a stack of composite material (3) arranged on the mandrel element (2) for obtaining a formed stack (3') of composite material, and at least one pressure rolling forming device (4) assembled in a support carriage (5) such that it is capable of placing the pressure rolling forming device (4) in at least one position in which it rolls over the stack of composite material (3) pressing it against the mandrel element (2) for forming it and obtaining the formed stack (3'), the pressure rolling forming device (4) comprising a rolling hollow cover (4a) made of elastically flexible material with a tread (4b), and the rolling hollow cover (4a) being susceptible to containing: a fill fluid at a fill pressure and/or a (Continued)

plurality of particles (27) which allow the tread (4*b*) to elastically adapt to the shape of the mandrel element (2) and exert a chosen pressure on the stack of composite material (3).

16 Claims, 21 Drawing Sheets

(51) Int. Cl.
*B29C 70/50* (2006.01)
*B29D 99/00* (2010.01)

(52) U.S. Cl.
CPC ........ *B29C 70/504* (2013.01); *B29D 99/0003* (2013.01); *B29D 99/0007* (2013.01); *Y10T 156/14* (2015.01)

A-A

B-B

C-C

E-E

D-D

F-F

G-G

H-H

I-I

SYSTEM FOR FORMING STACKS OF COMPOSITE MATERIALS

CROSS REFERENCE TO RELATED APPLICATIONS

This application is a 35 U.S.C. §371 National Phase Application of PCT International Patent Application No. PCT/EP2012/068642, filed Sep. 21, 2012, which application claims the benefit of priority to PCT International Patent Application No. PCT/EP2011/069330, filed Nov. 3, 2011, the contents of each of which are incorporated herein by reference in their entireties.

OBJECT OF THE INVENTION

The present invention relates to a system for forming stacks of composite materials; where said system has an application in the technical field of systems for forming stacks of preimpregnated composite material, particularly in the sector of systems for the continuous production of shapes of these stacks.

The purpose of this system is obtaining a device capable of automating the process for forming stacks of composite materials with a high surface quality level due to the steps and physical entities making it up, and where such number of entities and steps are extremely flexible when forming complex geometries of said stacks of composite materials.

BACKGROUND OF THE INVENTION

By way of introduction, it is known that the parts obtained from stacks of composite material (composites), such as for example those formed by sheets of resin preimpregnated carbon fibers or glass fibers (prepregs), are widely used in the industry, for example as components in the aeronautical industry such as stringers, stiffeners and structural reinforcements. These components are distinguished by their low weight and great mechanical strength (specific strength).

One of the technologies existing for forming stacks of composite material continuously is based on a roller and mandrel (roll-forming) system originally conceived for manufacturing metal sections. The metal rollers press the composite material against the surface of the mandrel compacting the composite material and giving it the shape of the mandrel. The obtained part is subsequently cured.

U.S. Pat. No. 7,249,943 describes an apparatus for forming stiffeners and other composite reinforcing elements, comprising a base the upper part of which has a longitudinal mandrel with the shape to be given to the sheet arranged thereon, as well as one or several rollers assembled in one or several supports, such that the rollers roll over the composite material pressing it against the mandrel for forming it and obtaining the composite part with the desired geometry and ready to be cured. The running surface of the rollers has a configuration complementary to the cross-section of the mandrel. Although this apparatus allows manufacturing straight structural sections with changes in thickness and curved, it is not capable of manufacturing more complex geometries, such as for example geometries with changes in plane to overcome obstacles (joggles), twisted geometries, etc.

Furthermore, even for obtaining simple geometric shapes such as omega-shaped components for example, it is necessary to have several rollers, all of which have their respective pressure adjustment systems, which complicates and makes the structure of such systems more expensive and jeopardizes the quality of the part obtained due to the occurrence of creases when the rollers act on the composite material.

Additionally, when working with solid rollers for more or less rigid surfaces, the pressure the rollers exert on the stack of preimpregnated composite material causes in some areas, depending on the geometry of the mandrel, a movement of the resin, reducing its thickness in certain parts of the material, which leads to the material and the corresponding parts formed from it to lose part of their strength characteristics as well as rigidity and dimensional tolerances after curing, which is particularly detrimental in applications of the parts in fields requiring particularly reliable qualities, such as the aeronautical industry for example. Another effect occurring in the roll-formed stacks is the so-called spring back phenomenon, consisting of the tendency to recover the initial geometry of the stack once it has been formed by the forming rollers.

Therefore, in view of the aforementioned and analyzed background document it has been observed that there is a need to provide a system for forming stacks of composite materials that prevents the aforementioned drawbacks, such that said system is capable of forming complex geometries such as those indicted above, which additionally allows applying homogenous pressure on said stacks and additionally gets the geometry obtained after deforming the stack to remain constant over time, without the so-called spring back phenomenon happening.

DESCRIPTION OF THE INVENTION

Therefore, to solve the technical problem considered above, the present invention discloses a system for forming stacks of composite material, the stacks being for example stacks of preimpregnated carbon or glass fibers, comprising:

A base with at least one mandrel element arranged longitudinally in the upper part, having the mandrel element the shape to be given to the stack of composite material, which is arranged on the mandrel element for obtaining the formed stack, and At least one pressure rolling forming device assembled in a supporting device such that it is capable of placing the pressure rolling forming device, for example in the form of roller or wheel, in at least one position in which it rolls over the stack of composite material, pressing it against the mandrel element for forming it and obtaining the formed stack, where the pressure rolling forming device additionally comprises a rolling hollow forming cover made of flexible material with a tread which is preferably smooth.

Two possibilities of containing the rolling hollow cover are additionally contemplated, both possibilities being able to be compatible with one another, and where:

In the first possibility it is contemplated that the rolling hollow forming cover is susceptible to containing at least one fill fluid, such as air, or an inert gas, at a fill pressure which allows the tread to elastically adapt to the shape of the mandrel element and exert a controlled pressure in a more extensive, adaptable and controlled pressure area on the stack of composite material.

In the second possibility it is contemplated that the rolling hollow forming cover is susceptible to containing a plurality of particles, where said particles are preferably heavy: i.e., they have a high density such that they act gravitationally and are deposited in the area to be formed, being able to contemplate that the material is metal and that they cause the effect of allowing the cover to form the stack as a result of the pressure generated by the actual weight of respective particles, acting in the gravitational sense as indicated.

It is therefore observed that the most important contribution of the present invention is the versatility and adaptability of the pressure rolling device that can be used as a forming element that is adaptable to many different and useful geometries and to curves, joggles and changes in thickness of the component to be formed. The chamber of each pressure rolling device can exert a uniform pressure force on the stacks without in turn imposing a uniform geometry.

The pressure rolling forming device is preferably assembled in a vertically adjustable mechanism for regulating the height and the pressure exerted by the pressure rolling forming device on the stack of composite material, the vertically adjustable mechanism being assembled in the supporting device. According to the invention, the supporting device can be, for example, a support carriage that is longitudinally movable with respect to the mandrel element. The supporting device can alternatively be stationary in which case the mandrel element is longitudinally movable with respect to the supporting device.

The pressure rolling forming device is assembled in the supporting device such that when it rolls over the stack of composite material, it presses it against the mandrel element such that the sheets forming it are compacted and adapted to the surface of the upper face of the mandrel element, thus progressively adopting the shape of the mandrel element and the formed stack thus being formed.

Due to the flexibility of the rolling hollow forming cover, the pressure of the tread on the stack of composite material arranged on the mandrel element makes the sheets of the stack of composite material adapt to the contour of the mandrel element, such that as the pressure rolling forming device rolls in the longitudinal direction on the stack of composite material, successive parts of the stack are trapped between the smooth surface of the tread and the mandrel element. Therefore, the stack of composite material is compacted and formed with the desired end geometry with the passage through the pressure rolling forming device. The nature of the rolling hollow forming cover allows the cover to adapt to surfaces of stacks of composite material arranged on mandrel elements with shapes that have no side symmetry, so it allows forming stacks formed with sides having different configurations, which is a substantial advantage of the present invention compared with technology with solid, more or less rigid rollers used in conventional roll-forming systems.

On the other hand the rolling hollow forming cover has a greater capacity for adaptation than conventional roller systems do, absorbing to a greater extent the changes in the geometry of the mandrel element (for example joggles or asymmetries), and exerting the pressure more progressively, uniformly and on a more extensive contact surface which, on one hand, reduces the number of creases and the magnitude thereof and, on the other hand, prevents movements of the resin, the desired distribution of the resin in the formed stacks thus being maintained to a greater extent, which in turn allows obtaining formed stacks with a higher quality in terms of, for example, their strength, rigidity and dimensional tolerances.

Another added effect of the present invention to be highlighted with respect to the conventional system of metal or elastomeric rollers is the securing effect that the rolling hollow forming cover exerts in its tread as a result of its larger contact surface on the stack of composite material, which helps in immobilizing the stack, to a greater extent preventing its movement with respect to the axis of symmetry in the roll-forming process as well as the subsequent occurrence of creases.

For example, when forming an omega-shaped stringer, since the tread can exert a pressure front acting simultaneously on the head (upper part), on the flanks and on the feet (side flaps) of the stack of composite material, such that with one or several chambers, which are either pneumatic chambers or internally include the plurality of heavy particles, rolling from the initial part of the stack towards the end part, a formation of the stack of composite material progressively takes place with the expulsion of air from the central part towards the sides and from top to bottom, which contributes to reducing creases in the formed stack, a formed and compacted high-quality stack thus being obtained. The flexibility and adaptability of the rolling hollow forming cover also helps to reduce internal stresses in the stack of composite material.

In a possible embodiment of the invention, the system further comprises at least one pair of side pressure rolling devices assembled on transversely opposite sides of the supporting device by means of respective rotating shafts transverse to the mandrel element, such that they roll and exert pressure respectively on respective flanks defined between the upper part and respective side parts of the formed stack by the action of the rolling hollow forming cover of the pressure rolling forming device before this pair of side pressure rolling devices. At least one of the side pressure rolling devices preferably comprises an elastically flexible side rolling hollow cover, provided with a tread and filled with at least one fill fluid (because in this case the inclusion of heavy particles can only be used in combination with pressurized fluid and with a specific inclination of the side pressure rolling devices, due to the gravitational pressure of the heavy particles) which allows the tread to elastically adapt to the corresponding flank of the mandrel element and exert a predetermined pressure on the flank of the formed stack. The rotating shaft of at least one of the side rolling devices can be inclined with respect to the mandrel element for the purpose of acting more efficiently on the turning radii of the geometry.

For marking longitudinal radii joining the changes in plane of the section to be formed in the formed stack, the system can be provided with at least one pair of solid marking rollers assembled on transversely opposite sides of the supporting device by means of respective rotating shafts that are transverse and inclined with respect to the mandrel element such that they roll and exert pressure in the curved areas of the formed stack. At least one of the marking rollers can be made of an elastomeric material.

The system can also comprise at least one pair of solid leveling rollers, assembled on transversely opposite sides of the supporting device by means of respective rotating shafts that are transverse and coplanar with respect to the mandrel element such that they roll and exert pressure in respective side parts of the formed stack. At least one of the leveling rollers can be of elastomeric material.

In a possible embodiment of the invention, in which the supporting device is stationary and the mandrel element is longitudinally movable with respect to the supporting device, the system comprises an initial roller train comprising an upper initial pressure rolling forming device and a lower initial rigid roller, and an end roller train comprising an upper end pressure rolling forming device and a lower end rigid roller. The pressure rolling forming devices have the features detailed above in this description and can be assembled in a supporting device that can be as the one described above. The mandrel element is connected to driving means to drive the stack of composite material between the upper pressure rolling forming devices and the lower rigid rollers. One or more intermediate rollers can be arranged between the initial and end roller trains, such as those described above in the present specification for example, and it also preferably comprises one or more lower rigid intermediate rollers on which the mandrel element is supported. It can also comprise one or more upper intermediate pressure rolling forming devices.

According to this embodiment, the mandrel element can comprise a longitudinal upper part with an initial sector and an end sector, the initial sector having less height than the end sector, such that by the action of the pressure rolling forming devices on the stack of composite material a longitudinal head is progressively formed in the stack of composite material. The mandrel element can further comprise a lower face with longitudinal guiding means, for example a longitudinal track, in which the lower rigid rollers are guided.

The lower rigid rollers can alternatively be provided with respective circumferential grooves located between side contact surfaces, in which case the mandrel element is a guiding element in the form of a flat bar with a guided lower part in the circumferential grooves and an upper part protruding from the circumferential grooves. The end sector of the upper part of the guiding element protrudes more from the circumferential groove of the end rigid roller than the initial sector of the upper part of the guiding element projects from the circumferential groove of the initial rigid roller, such that when the rolling hollow forming covers roll over the stack of composite material arranged on the upper part of the guiding element and the side surfaces of the rigid rollers, the upper part of the guiding element is susceptible to forming a longitudinal head progressively increasing in height in the stack of composite material. To achieve this increase in the height of the head of the stack of composite material, the guiding element can have a height increasing progressively from its initial sector to its end sector, and/or the circumferential groove in the initial rigid roller can be deeper than the groove in the end rigid roller. In this last case, the guiding element can have a uniform height from its initial sector to its end sector. Also in this case, they can be provided with one or more intermediate roller trains in which the lower rigid rollers also preferably have circumferential grooves located between side contact surfaces in which the lower part of the guiding element is guided.

The system for forming stacks of composite material according to the present invention can further comprise at least one compaction system, comprising at least one extensible cover and extending means to deposit the extensible cover on at least one part of the formed stack to compact the formed stack arranged on the mandrel element, the compaction system comprising a thermal treatment system with a thermal blanket as the extensible cover and/or a vacuum bag compaction system with a laminar band as the extensible cover, or a combined compaction system with an extensible multipurpose cover integrating the thermal bag and the laminar band.

The extending means can be assembled in a supporting structure for progressively depositing the extensible cover at least on the formed stack. The extensible cover is preferably made of a flexible material that can be wound on a winding device forming part of the extending means, such that the extensible cover is deposited on the stack after unwinding it from the winding device.

To deposit the extensible cover on the formed stack as it is unwound from the winding device, the extending means can comprise at least one extending and positioning roller assembled in the carriage. In a preferred embodiment, the extending means comprise a first extending and positioning roller assembled transversely in the carriage such that it is capable of receiving the extensible cover and guiding it over the upper face of the stack of composite material formed, as well as a second extending and positioning roller assembled transversely in the supporting structure such that it is capable of depositing the extensible cover, after passage through the first roller, on the formed stack. The winding device is preferably assembled in the supporting structure, and the supporting structure forms part of the supporting device.

According to the invention, several compaction systems can be provided, such as for example a vacuum bag compaction system and a thermal treatment system, which can serve to heat and/or cool the stack of composite material formed and can each comprise different respective consecutive extending means to deposit the extensible cover or, if the extensible cover is a multipurpose cover integrating the thermal blanket and the vacuum bag, common extending means to deposit the multipurpose cover.

In process for the continuous roll-forming of components such as stringers, once the component is formed it tends to experience the spring-back effect, i.e., once the forming rollers have formed the stack of composite material, the formed stack may tend to partially recover its initial geometry. To prevent this effect, after the process for forming stacks of composite material a vacuum bag can be used, said vacuum bag consisting of a closed volume formed by a film or membrane covering the stack of composite material, which is deposited on a preferably smooth surface and is enclosed within the closed volume. The leak-tightness of the vacuum bag is achieved by means of sealing elements along the perimeter of the vacuum bag. Furthermore, depending on the type of film or membrane used, aeration fabrics may be necessary for being able to extract the air in the entire closed volume. The vacuum is made by connecting a circuit coming from a vacuum system, for example a vacuum pump, to the closed volume of the vacuum bag by means of at least one special valve for applications of this type.

In the vacuum bag compaction system which, according to the present invention, can be used to prevent the spring-back effect, the extensible cover can be formed by a vacuum bag formed by an extensible laminar band in the form of film or membrane, hermetically sealable along its sides at the base of the mandrel element, such that when it is connected to the vacuum circuit, it forms a bag acting on the formed stack, keeping it pressed against the mandrel element, compacting it and preventing the stack from recovering part of the initial geometry after being formed by the forming rollers (spring-back effect).

To place and position the extensible laminar band progressively on at least the formed stack, the compaction system can comprise, as extending means, placement means assembled in a supporting carriage structure movable along the mandrel element. These placement means can comprise a winding device on which the extensible laminar band is wound and from which it is unwound as the supporting carriage structure advances along the mandrel element. As the extensible laminar band is unwound from the winding device onto the formed stack, the placement means can comprise at least one placement roller assembled in the supporting carriage structure above the mandrel element.

In a preferred embodiment, the placement means comprise a first placement roller assembled transversely in the supporting carriage structure such that it is capable of receiving the extensible laminar band and guiding it over the upper face of the stack of composite material or of the formed stack, as well as a second placement roller assembled transversely in the supporting carriage structure such that it is capable of depositing the extensible laminar band, after passage through the first placement roller, on the compacted stack. The winding device is preferably assembled in the supporting carriage structure, and the supporting carriage structure forms part of the supporting device.

The extensible laminar band can be placed on the stack of composite material before passage through pressure rolling forming device or devices, in which case, and taking into account that the configuration of pressure rolling devices internally comprising a fill fluid has been chosen, at least one of the pneumatic chambers of said pressure rolling forming devices can also serve to press the pneumatic band on the contour of the formed stack. Complementarily, or if the placement means are arranged for placing the extensible laminar band after the passage of pressure rolling forming device or devices, the vacuum bag compaction system can comprise a pressure rolling placement and sealing device, comprising an elastic rolling hollow placement cover with a tread and filled with at least one fill fluid at a fill pressure which allows the tread to elastically adapt to the contour of the formed stack, and sized such that it is susceptible to pressing the sides of the extensible laminar band against the side parts of the base of the mandrel element to enable the hermetic sealing of the laminar band and, therefore, the generation of the vacuum bag. The air inlet pathways which would cancel out the vacuum effect generated inside the closed volume are thereby substantially prevented by the vacuum bag as the support carriage advances forward.

Depending on the geometry of the stack of composite material, the film or membrane constituting the laminar band which allows forming the vacuum bag can incorporate auxiliary and necessary elements to generate the vacuum, such as for example an absorption or aeration fabric. This film or membrane, with its possible auxiliary elements, is unwound from the winding device and extended over the exposed face of the stack of composite material such that as a result of its flexibility, it substantially adapts to the surface and contour of the formed stack that is located on the mandrel element. Leak-tightness elements, among others, can be provided to seal the free sides and the end of the laminar band forming the vacuum bag on the base of the mandrel element such that the air inlet pathways in the area where the vacuum is generated are substantially prevented. To seal the sides of the vacuum bag in the case of complex geometries of the formed stack, the mandrel element can comprise longitudinal notches at its base which, by means of a rolling dispensing system assembled in the supporting carriage structure, allow internally housing respective joints assuring the lateral leak-tightness of the membrane as it is extended while the supporting carriage structure advances forward, closing and sealing the volume of the vacuum bag inside which the stack of composite material and/or the formed stack is confined and where the vacuum is applied.

The vacuum is established from the beginning in the case of choosing pressure rolling devices internally comprising a fill fluid and as the closed volume grows behind the pressure rolling device in the longitudinal direction of the mandrel element and in the same advancement direction of the support carriage due to the pressure exerted by the rolling hollow cover of the pressure rolling forming device and/or of the pressure rolling placement device. Therefore, when the support carriage moves together with the pressure rolling device, the vacuum keeps the formed stack pressed against the mandrel element, compacting the desired geometry as the formed stack cools down or, where appropriate, as will be explained below in the present description, becomes cured. At least one vacuum valve where the circuit coming from the vacuum pump will be connected is installed in the retained area of the laminar band.

According to this preferred embodiment, when the supporting device advances forward and the pressure roller forms the stack of composite material, the bag, the free end of which is retained in the rear part of the base of the mandrel element, gradually unwinds from the winding device and is deposited progressively on the stack of composite material, going through at least one placement roller and then through the pressure rolling forming device with the rolling hollow cover. When the compaction process has ended this system moves backwards, rewinding the membrane and, where appropriate, the side leak-tight joints, leaving the formed stack free.

In another embodiment of the system, and depending on the complexity of the end geometry of the component, the placement means of the extensible laminar element of the vacuum bag and the leak-tight joint dispensing system, when needed, can be placed in front of the forming carriage, such that the pressure rolling forming device or devices place and seal, while at the same time forming the extensible laminar band to form the vacuum bag.

In processes for the continuous roll-forming of composite parts, the cooling of the component is usually essential to compact the formed composite material part and stopping the curing process started in the heating applied to the stack prior to and during the forming process, and also for storing the formed component in a cold chamber for subsequent curing. Existing technologies are based on cooling the mandrel element by means of pressurized air systems on the exposed face of the stack of composite material or by means of a cooling circuit integrated in the mandrel element.

To perform a thermal cooling treatment, the present invention can be provided with a thermal compaction system, such as for example with a cooling system to compact the geometry of the formed stack, in which the extensible cover is a thermal cooling blanket. This system reduces the process time because it continuously follows the forming process and has a high thermal energy transfer capacity because it is in direct contact with the exposed face of the formed stack. Furthermore, it minimizes thermal inertia because it substantially reproduces the geometry of the formed stack and, accordingly, the cooling achieved is more homogenous, minimizing the internal stresses of the formed stack.

The thermal cooling blanket according to the present invention can comprise a lower face substantially capable of adapting to the contour of the formed stack arranged on the mandrel element and an upper face, and can be connectable to a heat exchange fluid cooling circuit, a liquid such as water for example, for which the thermal cooling blanket comprises at least one fluid inlet and at least one fluid outlet, connectable to the circuit coming from a cooling device, and at least one inner chamber located inside the thermal blanket, connected to the circuit coming from the cooling device through the fluid inlet and outlet of the thermal blanket.

To position the thermal blanket progressively on the formed stack, the thermal treatment system can comprise as extending means positioning means assembled in a supporting carriage structure movable along the mandrel element. These positioning means can comprise a winding device on which the thermal blanket is wound and from which the thermal blanket is unwound as the supporting carriage structure advances along the mandrel element. To deposit the thermal blanket as it is being unwound from the winding device onto the formed stack, the positioning means can comprise at least one positioning roller assembled in the supporting carriage structure above the mandrel element. In one embodiment, the positioning means comprise a first positioning roller assembled transversely in the supporting carriage structure such that it is capable of receiving the thermal blanket and guiding it over the upper face of the formed stack, as well as a second positioning roller assembled transversely in the supporting carriage structure such that it is capable of depositing the thermal blanket, after passage through the first positioning roller, on the compacted stack. The winding device is preferably assembled in the supporting carriage structure, and the supporting carriage structure forms part of the supporting device.

Although the thermal blanket has a natural geometry that reproduces the exposed surface of the stack of composite material such that it substantially adapts to the contour of the formed stack located on the mandrel element as a result of its flexibility, preferably, it is also capable of acquiring a substantially planar geometry substantially as it is wound on the winding device assembled in the supporting carriage structure.

In a preferred embodiment of the invention, the thermal cooling blanket comprises a plurality of tubes that extend between its upper and lower faces and can be connected to the fluid inlet by means of at least one inlet manifold and to the fluid outlet by means of at least one outlet manifold. In this embodiment, the inlet and outlet of this circuit of tubes inside the thermal blanket are preferably located at the fixed end of the thermal cooling blanket, such that the fluid flows through the tubes inside the thermal blanket from the fixed end at which the fluid inlet is located to the opposite end to again return to the fixed end, such that correct cooling takes place. Thermocouples are additionally placed inside the thermal blanket for controlling and regulating the temperature of the thermal blanket. The connectors thereof are also located at the fixed end of the thermal blanket. The distribution of the tubes inside the thermal blanket and the path of the coolant are configured such that it compensates for the thermal inertia of the mandrel element and a more homogenous and efficient cooling of the stack is thus achieved.

Alternatively, the same thermal blanket can also be used as a heating blanket to cure the formed stack. To that end, the thermal blanket can be provided with at least one heated wire extending longitudinally through the inside of the thermal blanket and supplied by the corresponding electrical circuit, or a heating fluid can be circulated through the inside of the thermal blanket. In this last case, the inlet and fluid outlet are connected to a heat exchange circuit comprising a heating device. The blanket is made of a flexible material capable of withstanding a temperature greater than the curing temperature of the formed stack to which either the fluid coming from the heat exchanger or the heated wires is heated to cure the resin. The heating fluid can be, for example, a special liquid for applications of this type, such as oil. The distribution of the tubes or heated wires and the flow direction or the temperature of the heated wires are configured in the same way as the cooling blanket to compensate for the thermal inertia of the mandrel element.

Both in the case of the cooling blanket and the heating blanket, to increase the thermal energy transfer capacity, the system can be provided with at least one duct for a heat exchange fluid which extends internally through the mandrel element and can be connectable to the circuit where the fluid coming from the circuit coming from the cooling device or from the heating device circulates.

The thermal blanket can be positioned on the stack of composite material directly after the passage of the pressure rolling forming device or devices.

Alternatively, if the system for forming stacks of composite material according to the present invention also comprises the vacuum bag compaction system described above, the thermal blanket can be positioned on the extensible laminar band which is placed on the formed stack.

When the stack of composite material has been formed and the thermal blanket arranged, a cooling liquid, for example cold water, can be circulated through the ducts inside the mandrel element and through the ducts of the thermal blanket for the purpose of cooling and, therefore, compacting the formed stack. Once the formed stack is compacted, in this type of application the formed stack compacted by cooling is removed from the mandrel element and placed in cold storage until used in an autoclave co-curing process.

Alternatively, in the application of curing the formed stack in the mandrel element itself, it is not necessary to cool the formed stack to compact its geometry because with extending the thermal blanket on the eventually compacted composite part in the vacuum bag, this time with circulating a heating liquid or by means of a heated wire integrated in the thermal blanket, curing is performed keeping the component in vacuum conditions and at the curing temperature during the necessary time, finally obtaining a compacted and cured part with the geometry reproducing the mandrel element. Therefore, this embodiment of the system according to the present invention can eliminate autoclave curing which on one hand allows skipping the step of transferring the formed composite part to the autoclave and eliminating the autoclave as such, and on the other hand it allows a more homogenous curing because since the thermal blanket adapts to the contour of the formed stack, a better and more homogenous application of heat for curing takes place.

Depending on the complexity of the geometry of the end component, the thermal blanket and the vacuum bag can be integrated in a windable multipurpose cover that can be deposited on the stack of composite material by extending and positioning means such as those described above. Such multipurpose cover can comprise a first flexible longitudinal part constituting the thermal blanket and a second part attached to the first which can be extended around and constitute the vacuum membrane or film which can incorporate the form of a leak-tight joint to assure the side sealing at the base of the mandrel element, constituting a single multipurpose cover that can be extended from a winding device operating similarly to the winding device described above in reference to the thermal bag.

In relation to the form or entity containing the rolling hollow covers, the following possibilities are contemplated for:

If they internally comprise the fill fluid, said fluid can be a gaseous fluid such as air, liquid, viscous fluid or viscoelastic fluid, for example, and combinations of such fluids can also be used to fill the rolling hollow cover. In a preferred embodiment, the fill fluid is a gas, such as air for example, in which case the rolling hollow cover can be a pneumatic chamber. The weight, the thermal stability and viscosity of the fill fluid or fluids can be used as an element which helps to adapt the stack to the geometry of the mandrel element, which is particularly useful in hot forming processes. When the system is provided with several rolling hollow covers, they can contain the same or different fill fluids.

If they internally comprise the plurality of heavy particles, preferably metal particles, they can comprise cylindrical or spherical geometries that are identical to or different from one another in diameter; they can be lubricated to favor their movement inside said chamber, and where the possibility that the measurement range of their diameter is comprised between 0.5 mm and 3 mm, preferably having a diameter of 1 mm, is particularly contemplated.

Therefore, according to the described invention, the system for forming stacks of composite materials object of invention is an important novelty in forming systems, mainly in relation to the capacity of forming complex geometries such as those indicated in the state of the art in the background section; it can be readily automated and is flexible to each case; and it additionally allows applying homogenous pressure on the stacks of composite material which means that the geometry obtained after the deformation of the stack remains constant over time, without the so-called spring back taking place.

DESCRIPTION OF THE DRAWINGS

To contemplate the description that is being given and for the purpose of aiding to better understand the features of the invention according to a preferred practical embodiment thereof, a series of drawings is attached as an integral part of said description where the following has been depicted with an illustrative and non-limiting character.

Figure 1:
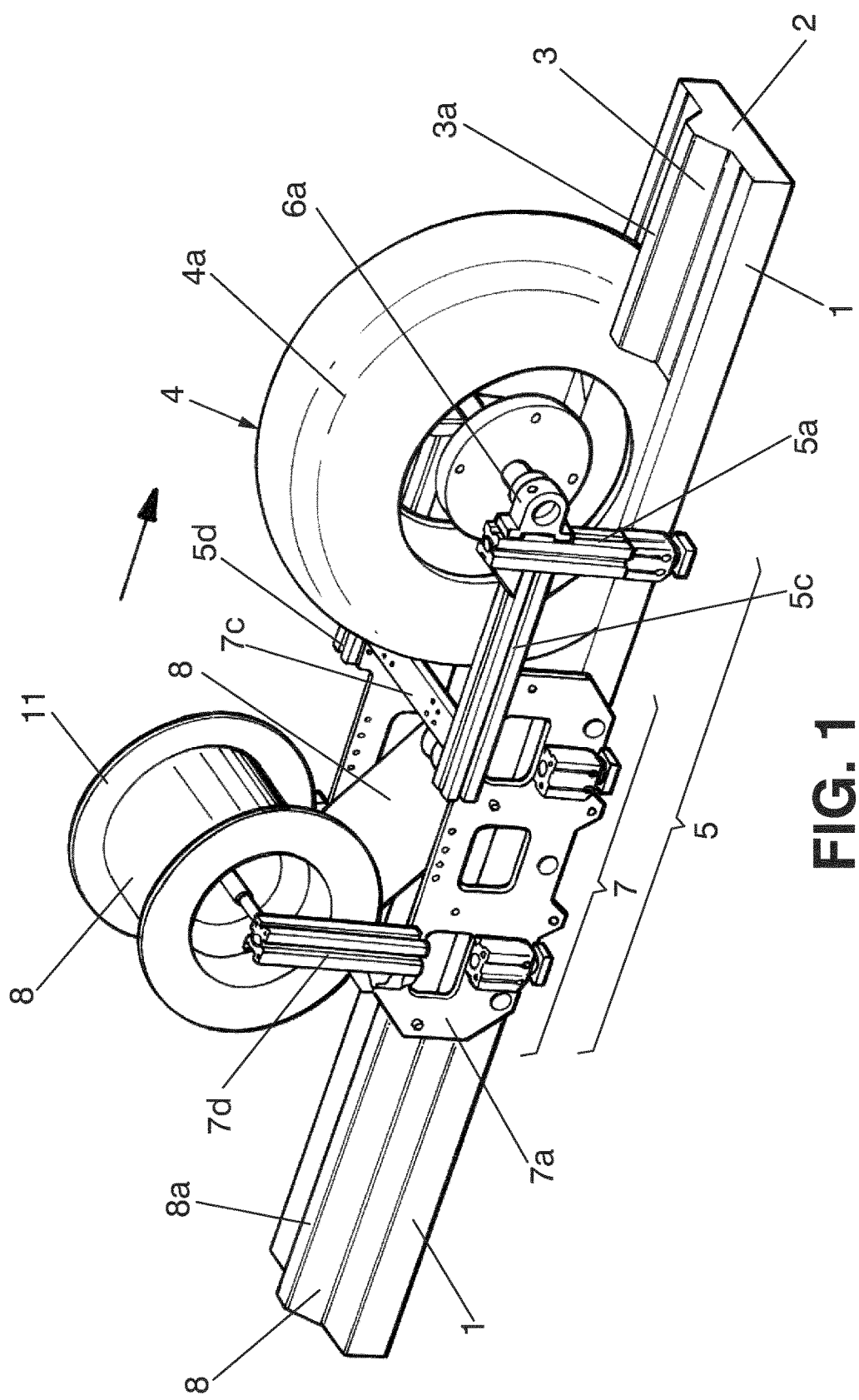
FIG. 1 is a front-side perspective view of a first embodiment of the forming system according to a the present invention.

Reference numbers identifying the following elements are shown in these drawings:

1 base
2 longitudinal mandrel
2a upper part of the mandrel
2b duct for heat exchange fluid in the mandrel
2c longitudinal track
2d lower part of the mandrel
3 stack of preimpregnated composite material
3a upper face of the stack
3' formed stack
3a' upper face of the formed stack
4 pressure rolling forming device
4a rolling hollow forming cover
4b tread
4c rim
4d rotating shaft
5 forming carriage
5a, 5b vertical supporting profile
5a', 5b' lower vertical supporting profile
5c, 5d horizontal attachment profile
5c', 5d' lower horizontal attachment profile
5e, 5f longitudinal extension
6a, 6b tab
7 supporting carriage structure
7a, 7b side partition
7c transverse attachment rod
7d, 7e vertical supporting profile
8 thermal blanket
8a upper face
8b lower face
8c longitudinal tubes 8d fluid inlet
8e fluid outlet
8f inlet manifold
8g outlet manifold
9a first positioning roller
9b second positioning roller
10 heat exchange fluid circuit
10a cooling device
10b heating device
10c fluid pump
10d feed duct
10e outlet duct
10f directing valve
10g valve of the cooling circuit
10h valve of the heating circuit
11 winding device
12 support wheel
13 lower guiding wheel
14 supporting carriage structure
14a, 14b side partition
14c, 14d vertical supporting profile
15 winding device
16 laminar band of the vacuum bag
17a first placement roller
17b second placement roller
18 multipurpose cover
18a first part of the multipurpose cover
18b second part of the multipurpose cover
19 heated wires
20 side pressure rolling device
20a side rolling hollow cover
21 securing pressure rolling device
21a securing rolling hollow cover
22 radius marking elastomeric roller
23 leveling elastomeric roller
24 pressure rolling placement device
24a rolling hollow placement cover
25 fixing system
26 lower rigid roller
26a perimetric rib
26b rotating shaft
26c circumferential groove
26d side contact surface
27 inner particles of the rolling hollow cover

PREFERRED EMBODIMENT OF THE INVENTION

In view of the drawings, a series of multiple preferred embodiments of the system for forming stacks of composite materials object of invention can be observed, and where in view of FIGS. 1 to 5 it is shown that the system for forming stacks of composite material comprises a base -1- with a longitudinal mandrel element in the form of a longitudinal mandrel -2- having an omega-shaped cross-section to be given to a laminar composite material -3- which can be, for example, a preheated stack of prepregs which is arranged on the mandrel -2- for obtaining a formed stack -3'-.

The system also comprises a supporting device in the form of a forming carriage -5- in which a pressure rolling forming device is assembled in the form of a pressure forming roller -4- comprising a rolling hollow forming cover in:

The form of an inflatable forming pneumatic chamber -4a- with a tread -4b- which has a smooth surface and is elastically adaptable to the shape of the mandrel -2-, where the forming pneumatic chamber -4a- is susceptible to containing at least one fill fluid at a fill pressure which allows the tread -4b- to elastically adapt to the shape of the mandrel -2- and exert a chosen pressure on the stack of composite material -3-.

Figure 29:
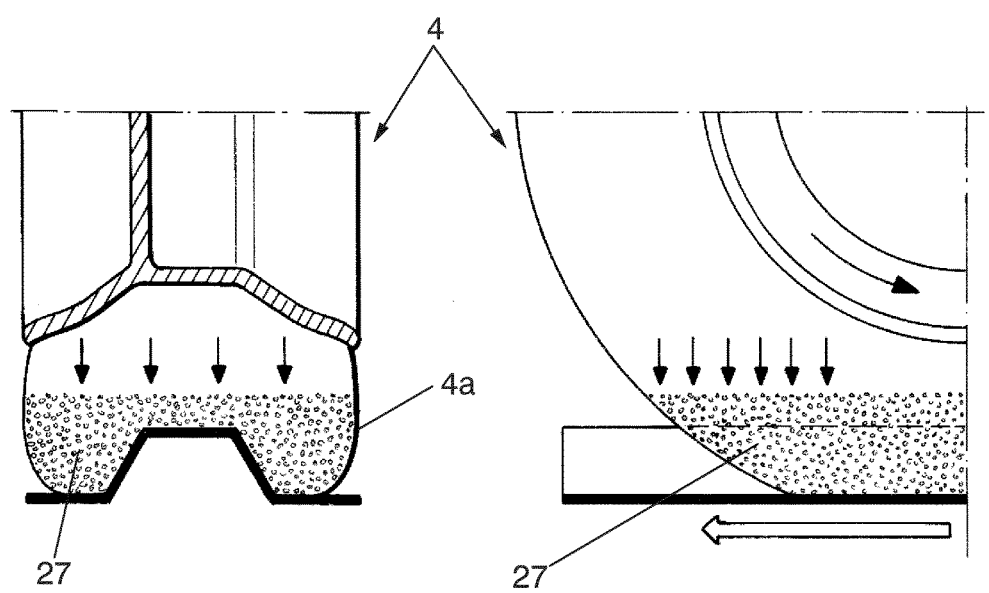
FIG. 29 is a cross-section view of one of the rolling hollow covers, being the plurality of particles therein observed.

The form of an internally hollow chamber comprising a plurality of heavy metal particles -27- and air at a fill pressure which allow the tread -4b- to elastically adapt to the mandrel element -2- and exert a controlled pressure on the stack of composite material -3-, where this preferred embodiment can be observed in FIG. 29.

Figure 6:
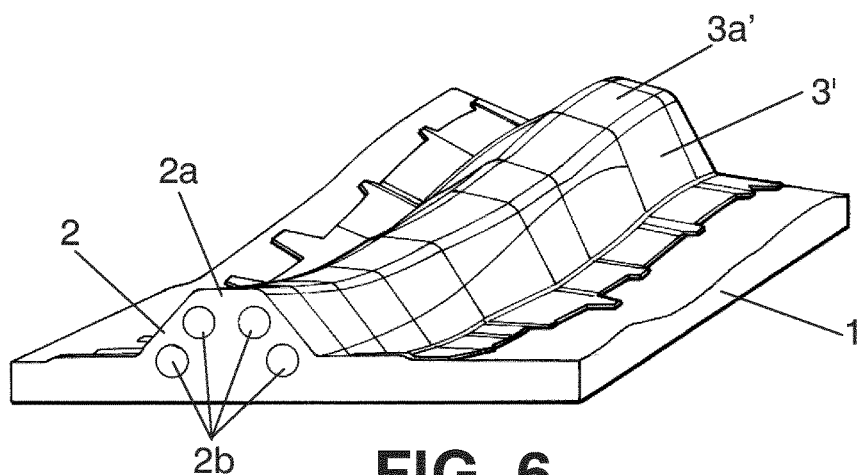
FIG. 6 is a front perspective view of an embodiment of a mandrel element on which a shaped laminar material is superimposed.

Several ducts -2b- through which a heat exchange fluid can circulate extend through the inside of the base -1- and the mandrel -2-. As shown in FIG. 6, the mandrel -2- can have a complex shape which allows obtaining formed composite parts, for example with an omega-shaped cross-section with a variable geometry extending in variables planes, or other cross-section shapes.

In the embodiment shown in FIGS. 1 to 5, the forming carriage -5- is a carriage longitudinally movable with respect to the mandrel -2-, comprising a supporting carriage structure -7-. The pressure forming roller -4- rotates about a transverse shaft coupled at its respective ends in respective tabs -6a, 6b- which are in turn assembled in respective vertical supporting profiles -5a, 5b-, the lower end parts of which are provided with respective lower guiding wheels -13- arranged such that they are susceptible to rolling on the lower face of the base -1-. The height at which the tabs -6a, 6b- are assembled in the vertical profiles -5a, 5b- is adjustable such that the tabs -6a, 6b- and the vertical profiles -5a, 5b- form a vertically adjustable mechanism -5a, 5b; 6a, 6b- which allows adjusting the vertical position of the pressure forming roller -4- and, therefore, contributing to regulating the pressure exerted by the pressure forming roller -4- on the stack of composite material -3-.

The supporting carriage structure -7- comprises respective side partitions -7a, 7b- also provided in its lower parts with lower guiding wheels -13- arranged such that they are susceptible to rolling on the lower face of the base -1-. The forming carriage -5- and its supporting carriage structure -7- are supported and can roll on the base -1- on one hand by means of the pressure forming roller -4- and, on the other, by means of the supporting wheels -12- which roll over the side of the upper face of the base -1, whereas in the lower portion they are guided in the base by means of the guiding wheels -13-.

The side partitions -7a, 7b- of the supporting carriage structure -7- are attached to one another by means of a transverse rod -7c-. At its end part opposite the pressure forming roller -4-, the supporting carriage structure -7- is provided with respective vertical supporting profiles -7d, 7e- between the upper parts of which a winding device -11- assembled on a transverse rotating shaft and on which a thermal blanket -8- in the form of a windable flexible band is wound is arranged. A first positioning roller -9a- assembled transversely in the supporting carriage structure -7- such that it is capable of receiving the thermal blanket -8- and guiding it positioned over the upper face -3a- of the formed stack -3'-, and a second positioning roller -9b- assembled transversely in the supporting carriage structure -7- such that it is capable of depositing the thermal blanket -8-, after passage through the first roller -9a-, on the formed stack -3'- are further arranged between the partitions -7a, 7b-. The supporting carriage structure -7- is attached to the forming carriage -5- by means of respective horizontal attachment profiles -5c, 5d- connecting the supporting profiles -5a, 5b- with the respective upper parts of the side partitions -7a, 7b- of the supporting carriage structure -7-.

Figure 7:
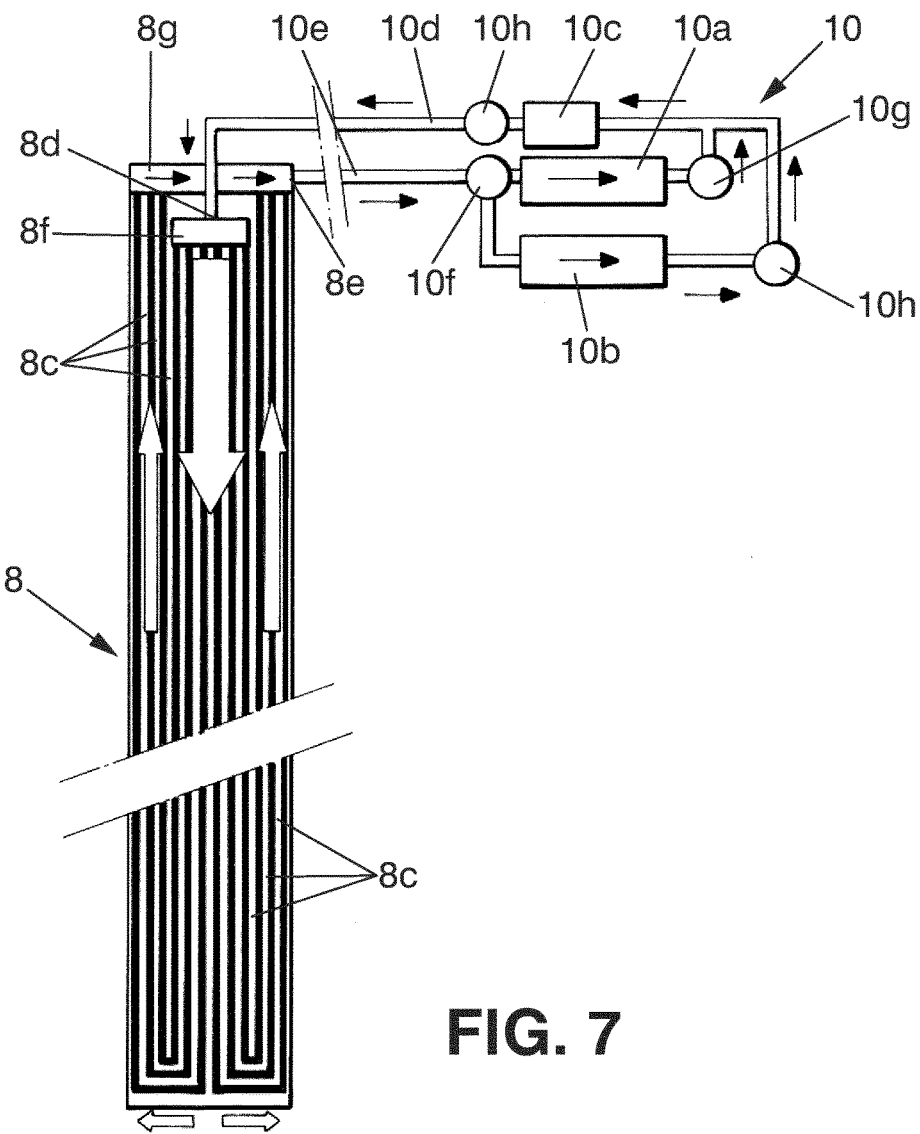
FIG. 7 is a simplified view of an embodiment of a heat exchange fluid circuit for the system according to the invention

The thermal blanket -8- is made of a flexible material and comprises an upper face -8a- and a lower face -8b- and is susceptible to adapting to the contour of the formed stack -3'- arranged on the mandrel -2- and internally comprises a plurality of also flexible longitudinal tubes -8c- extending between its upper face -8a- and lower face -8b-. As can be seen in FIG. 7, these longitudinal tubes -8c- are connected, for example by means of respective manifolds -8f, 8g- forming part of the thermal blanket -8-, respectively to a fluid inlet -8d- and a fluid outlet -8e-, such that a heat exchange liquid can flow through said tubes -8c-.

The thermal blanket -8-, together with the ducts -2b- extending axially through the inside the base -1- and the mandrel -2-, forms part of a thermal treatment system, as illustrated in FIG. 7, where it can be seen that the thermal blanket -8- comprises a fluid inlet -8d- and a fluid outlet -8e- which are connected respectively to an inlet manifold -8f- and to an outlet manifold -8g- which is in turn connected to the longitudinal tubes -8c-. In the embodiment shown in FIG. 7, the fluid inlet -8d- of the thermal blanket -8- is connected, through a feed duct -10d-, to a fluid pump -8c which in turn is susceptible to sucking a cold cooling fluid through a cooling device -10a- or a heating fluid heated by a heating device -10b-, and pumping it to the fluid inlet -8d- of the thermal blanket -8-. On the other hand, once the cooling fluid or, where appropriate, the heating fluid, has passed through the longitudinal tubes -8c-, it is collected by the outlet manifolds -8g-, passes through the fluid outlet -8e- and flows through the outlet duct -10e- from which, depending on whether it is a cooling or heating fluid, it is directed to the cooling device -10a- or to the heating device -10b- by the action of the directing valve -10f-. Valves -10g- and -10h- respectively interconnected in the circuit traveled by the cooling fluid and in the circuit traveled by the heating fluid are provided to direct the respective fluids.

Figure 2:
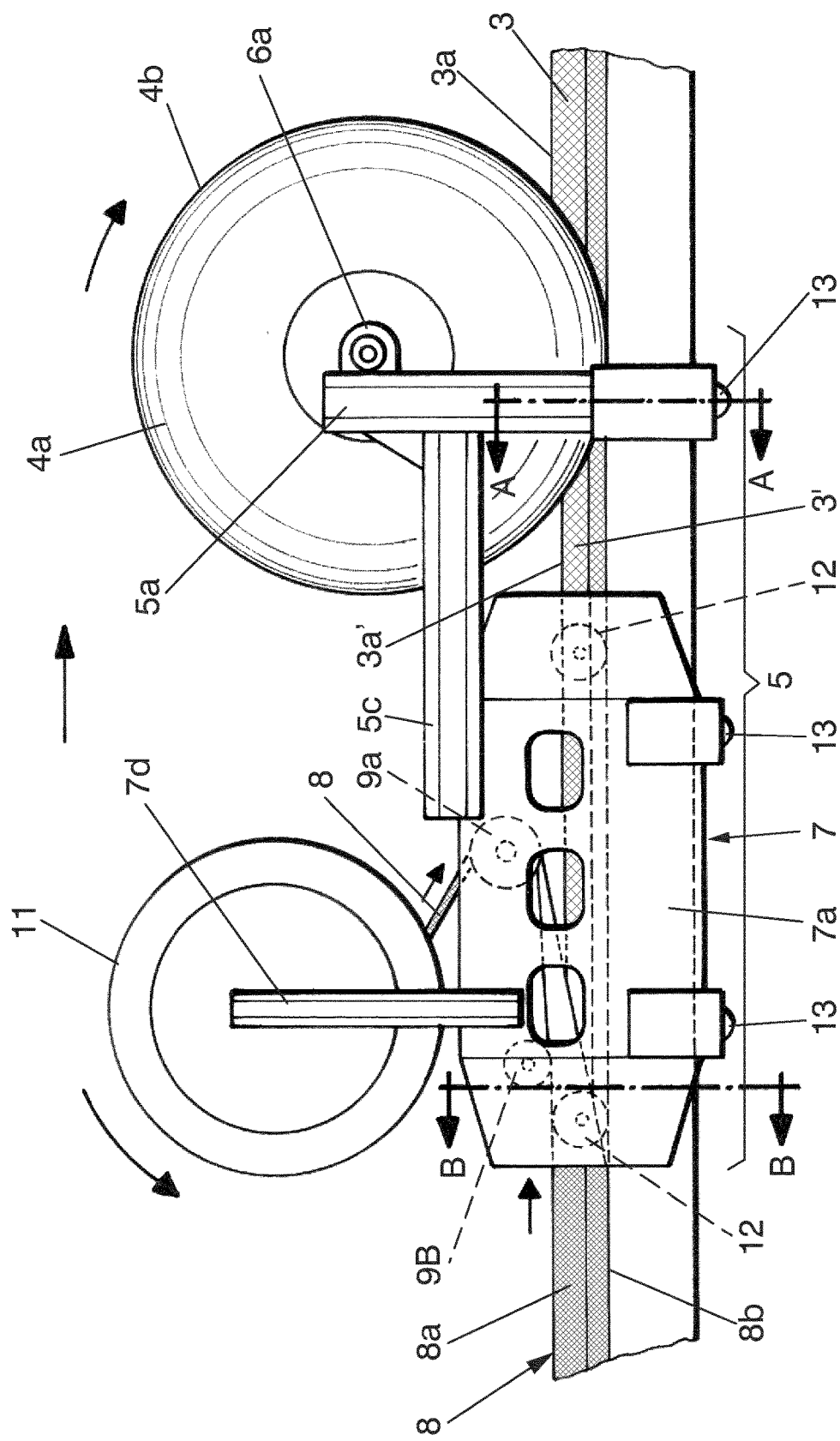
FIG. 2 is a simplified side elevational view of the forming system shown in FIG. 1.
Figure 3:
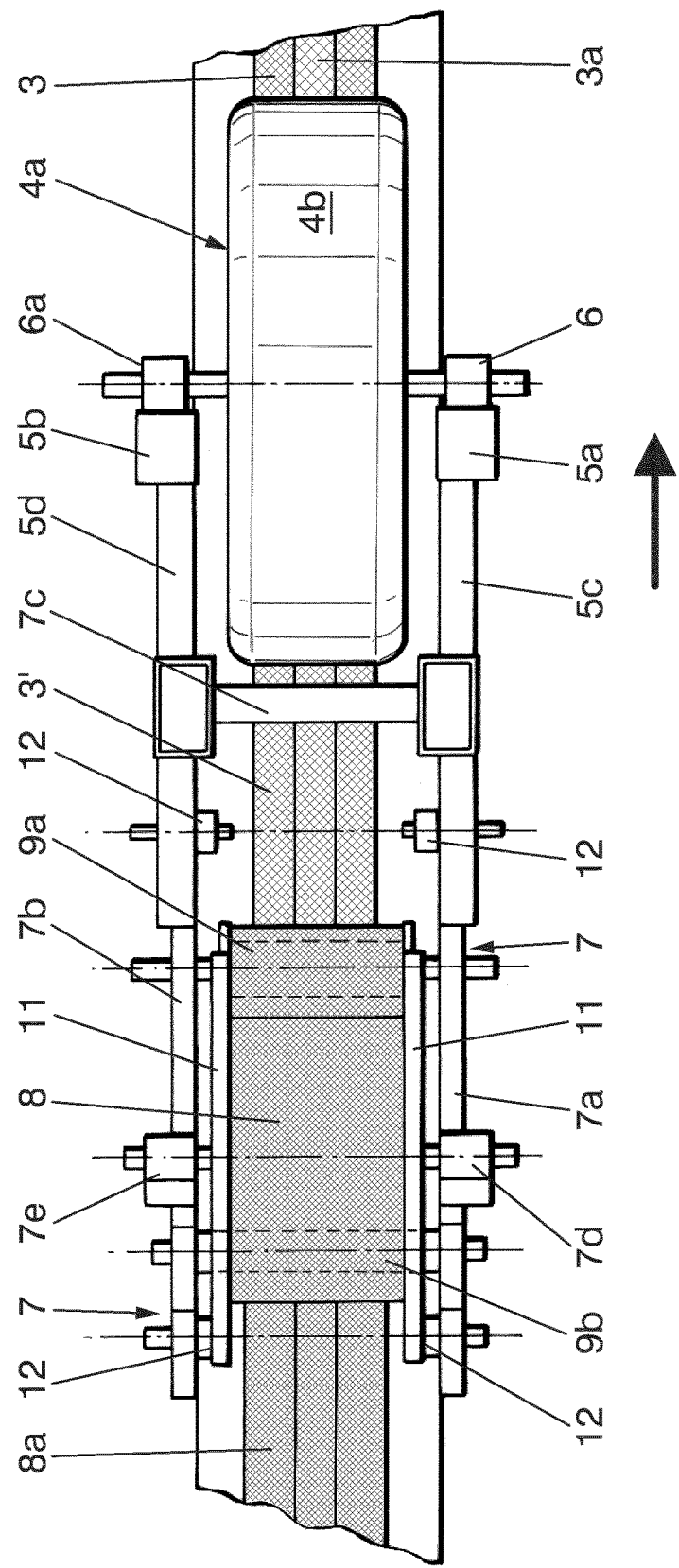
FIG. 3 is a simplified upper plan view of the forming system shown in FIG. 1.
Figure 4:
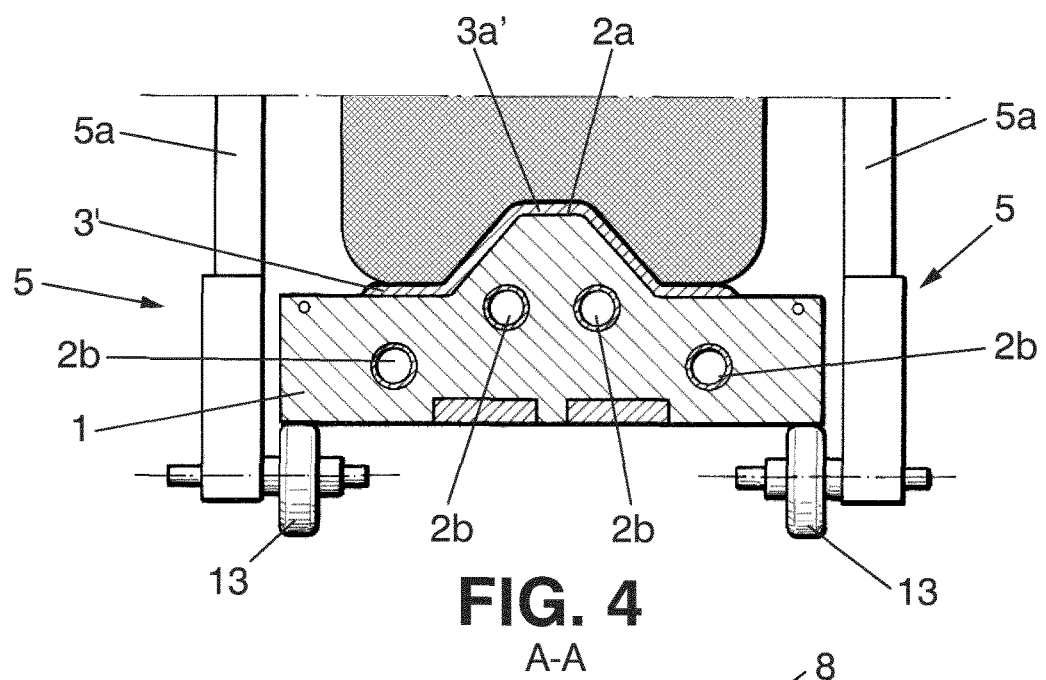
FIG. 4 is a cross-section view of the system along line A-A appearing in FIG. 2.
Figure 5:
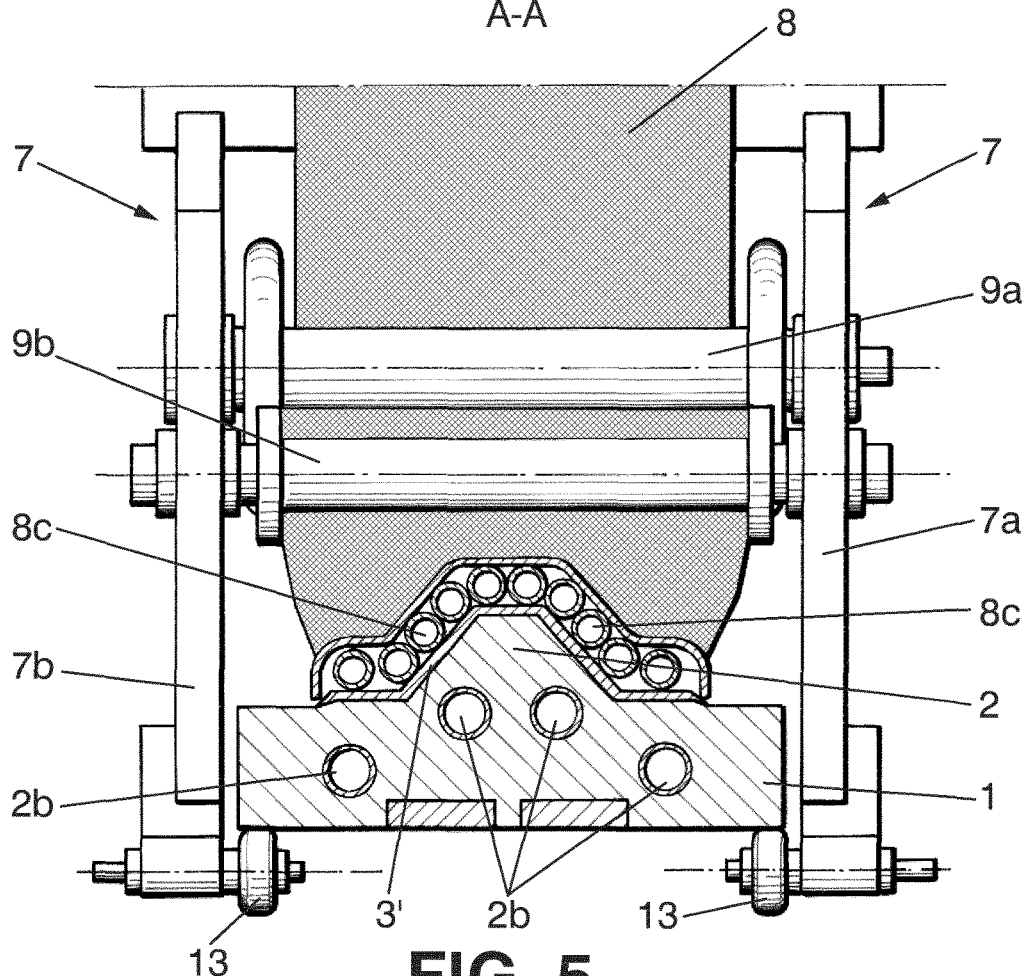
FIG. 5 is a cross-section view of the system along line B-B appearing in FIG. 2.

The embodiment of the system illustrated in FIGS. 1 to 5 operates as follows for obtaining a formed stack from the stack of composite material -3-:

1) Once the stack of composite material -3- is arranged on the mandrel -2- the forming carriage -5- and its supporting carriage structure -7- move due to the action of a motor (not shown in the drawings) such that the pressure roller -4- rolls in the direction of the arrows shown in FIGS. 1 to 3 for obtaining the formed stack -3'- from the stack of composite material -3- previously heated to a suitable temperature to assure its ductility for forming purposes, and if the stack of composite material -3- is a stack of prepregs, to activate the corresponding resin.

2) Given that the pressure forming roller -4- is assembled in the forming carriage -5- such that it presses the stack of composite material 3- against the mandrel -2-, the stack of composite material -3- is compacted and bends, thus progressively adopting the shape of the mandrel -2- and thereby becoming a formed stack -3'-. The flexibility of the forming chamber -4a- and the pressure of the tread -4a- on the stack of composite material -3- that is located on the mandrel -2- makes the stack of composite material -3- adapt to the contour of the mandrel -2- such that as the forming roller -4- rolls longitudinally over the stack -3-, successive parts of the stack -3- are trapped between the smooth surface of the tread -4b- and the mandrel -2- and the stack of composite material -3- is thus formed upon the passage of the pressure forming roller -4-, either by means of a pneumatic forming chamber -4a- or internally comprising the plurality of metal particles -27-.

3) Since the tread -4b- of the forming roller first exerts its pressure on the upper face -3a- of the laminar composite material -3-, and from there progressively on the sides and then on the side flaps of the stack of composite material -3-, and thus progressively from the front part of the stack of composite material -3- backwards, formation progressively takes place with the expulsion of air from the central part towards the sides and from top to bottom in the stack -3-, which contributes to the movement and reduction of creases in the formed stack -3'-, a high-quality formed stack -3'- thus being obtained.

4) As the carriage -5, 7- advances forward, the thermal blanket -8-, the free end of which is retained in the rear part of the base -1-, is gradually unwound from the winding device -11- and, going through the first positioning roller -9a- and then through the second positioning roller -9b-, is deposited progressively on the formed composite part -3'-. The presence of the second positioning roller -9b- is optional.

5) To compact the formed stack -3'-, a cooling liquid, for example cold water, is circulated through the ducts -2c- inside the base -1- and the mandrel -2-, and through the longitudinal tubes -8c- of the thermal blanket -8- for the purpose of cooling and, therefore, compacting the formed stack -3'-. Once the formed stack -3'- is compacted, the cooling liquid flow is cut off, the forming carriage -5- is withdrawn and the winding device -11- is operated to remove the thermal blanket -8- and wind it up again.

6) As an alternative to compacting the formed stack -3'-, a heating liquid, for example oil, can be circulated through the longitudinal tubes -8c- and ducts -2b- to heat the formed stack to its curing temperature, such as up to 180° C., for example, in the cases of parts obtained from prepregs, for obtaining a cured part.

Figure 8:
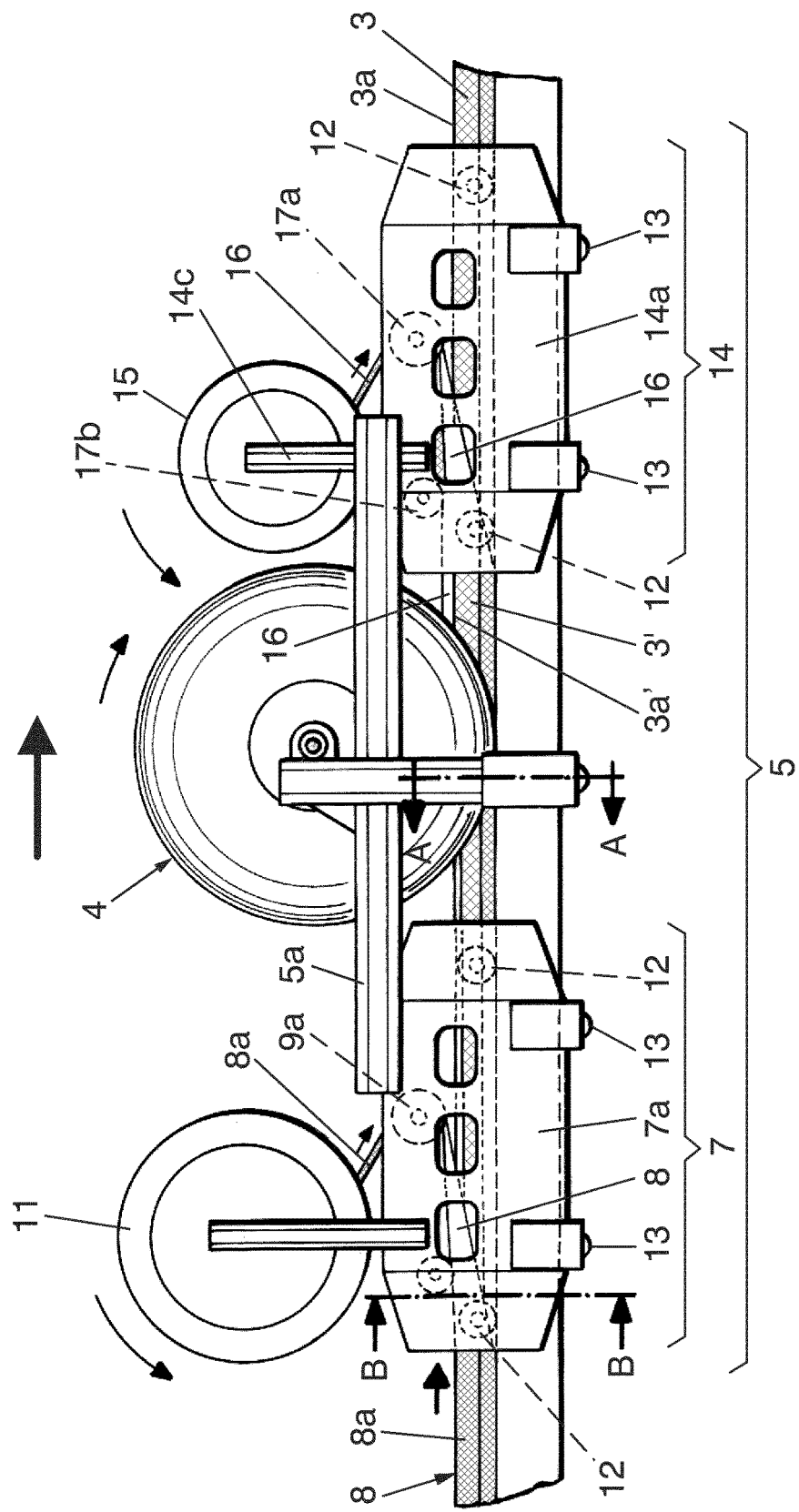
FIG. 8 is a simplified side elevational view of a second embodiment of the forming system according to the present invention.
Figure 9:
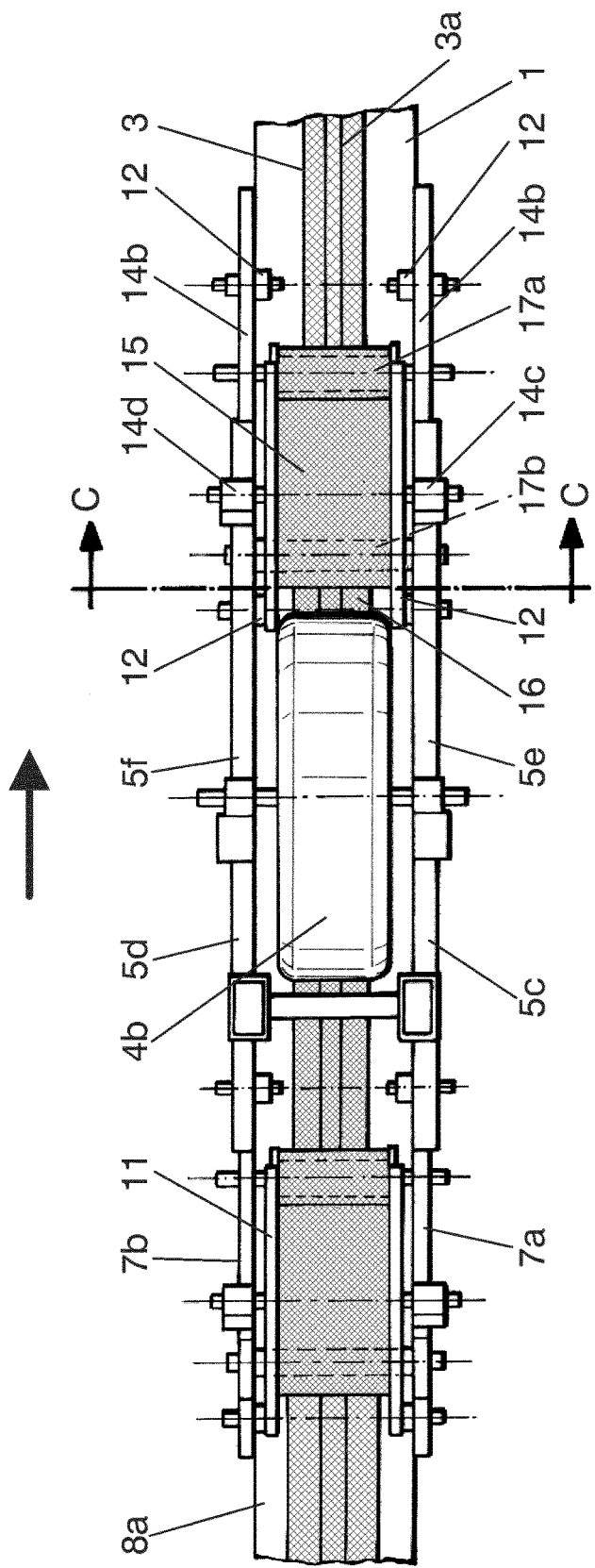
FIG. 9 is an upper plan view of the forming system shown in FIG. 8.
Figure 10:
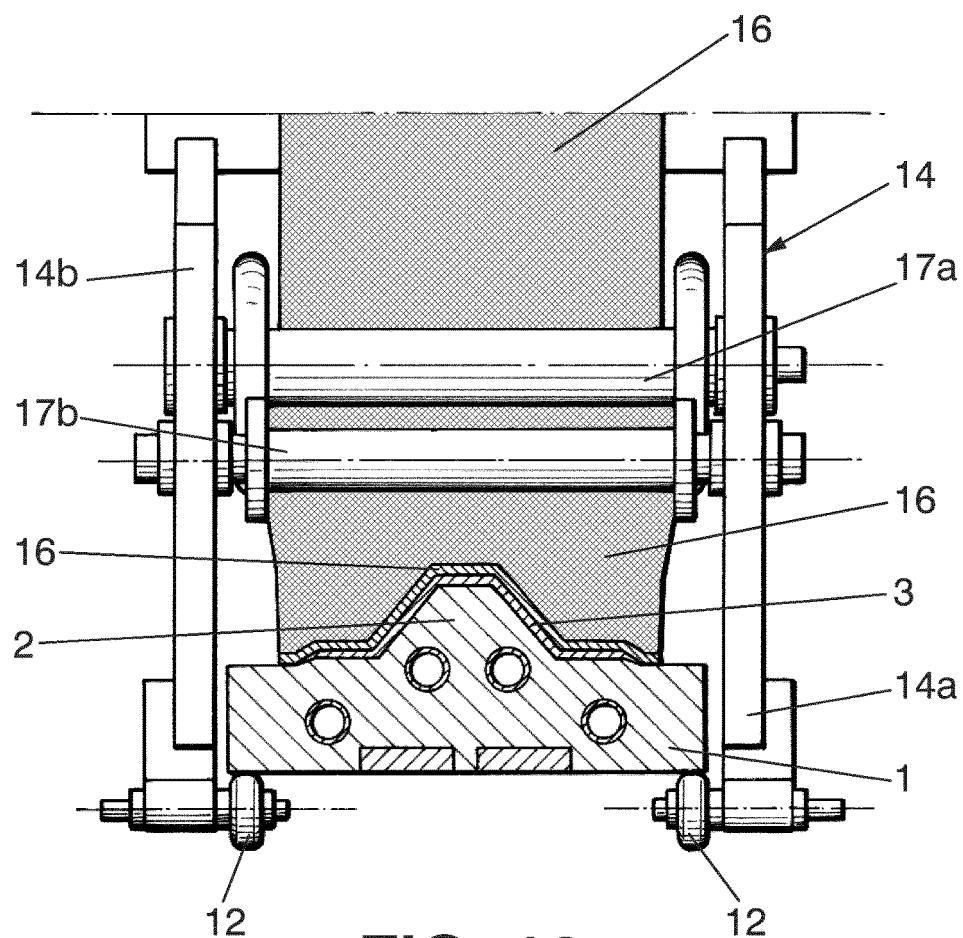
FIG. 10 is a cross-section view along line C-C appearing in FIG. 9.

In the embodiment shown in FIGS. 8 to 10, the system comprises all the elements described above in reference to FIGS. 1 to 17, and furthermore a vacuum bag subsystem compaction. As can be seen, the forming carriage -5- comprises a supporting carriage structure -14- with respective side partitions -14a, 14b-, also provided with supporting wheels -12- and lower guiding wheels -13-. The supporting carriage structure -14- is provided with respective vertical supporting profiles -14c, 14d- between the upper parts of which a winding device -15- assembled on a transverse rotating shaft and on which a windable laminar band -16- is wound, is arranged. A first placement roller -17a- assembled transversely in the supporting carriage structure -14- such that it is capable of receiving the laminar band -16- and guiding it positioned over the upper face -3a- of the stack of composite material -3-, and, optionally, a second placement roller -17b- assembled transversely in the supporting carriage structure -14- such that it is capable of depositing the laminar band -16-, after passage through the first placement roller -17a-, on the stack of composite material -3- are further arranged between the partitions -14a, 14b-. The supporting carriage structure -14- is attached to the forming carriage -5- by means of respective longitudinal extensions -5d, 5e- of the horizontal attachment profiles -5c, 5d- connecting the supporting profiles -5a, 5b- with the respective upper parts of the respective side partitions -7a, 7b; 14a, 14b- of the structures -7, 14-.

The laminar band -16- is a film or membrane serving to generate a vacuum in the stack of composite material -3- and can incorporate auxiliary elements necessary for generating the vacuum, such as an absorption or aeration fabric for example. The laminar band -16- with its possible auxiliary elements is unwound from the winding device -15- and extended over the upper face -3a- of the stack of composite material -3-, such that as a result of its flexibility, it substantially adapts to the surface and contour of the stack of composite material -3- placed on the mandrel -2-. When seen in the direction of movement of the forming carriage -5- in the embodiment of the system shown in FIGS. 8 to 10, the supporting carriage structure -14- with the winding device -15- is arranged in front of the pressure rolling forming device -4- such that the latter acts on the extended laminar band -16- such that since the pressure rolling forming device -4- has a large capacity to adapt to the exposed surface -3a- of the stack of composite material -3- due to its pneumatic chamber -4a-, it seals the longitudinal edges of the laminar band -16- against the base -1-, a vacuum bag thereby being formed around the stack of composite material -3-: by means of sealing the free sides of the laminar band at the base the air inlet pathways which would annul the effect of the vacuum generated inside the volume closed by the vacuum bag as the forming carriage -5- advances forward are substantially avoided.

The free sides of the laminar band arranged on the mandrel are also sealed by means of, among others, leak-tight elements (not shown in the drawings), such that the air inlet pathways in that area when generating the vacuum are substantially avoided. To seal the sides of the laminar band -16- and to thus form the vacuum bag in the case of complex component geometries, the mandrel can comprise longitudinal notches which, by means of a rolling dispensing system (not shown in the drawings) assembled in the forming carriage -5- or in the supporting carriage structure -14- allows internally housing a joint forcing the side leak-tight joint of the membrane as the latter is being extended while the carriage -5- advances forward, closing and sealing the sides of the laminar band -16- and thus creating the volume of the vacuum bag, inside which the material is confined and where the vacuum is applied.

In the case of using the pressure rolling forming device -4- with a pneumatic chamber -4a-; the vacuum is exerted from the beginning and as the closed volume of the vacuum bag grows behind the pneumatic chamber -4a- in the longitudinal direction of the mandrel -2- and in the same advancement direction as the forming carriage -5- due to the pressure exerted by the pressure rolling forming device -4-: The vacuum keeps the formed stack -3'- pressed against the mandrel -2- compacting the geometry of the formed stack -3'- as it cools down. At least one vacuum valve (not shown in the drawings), where it will be connected to a pneumatic circuit coming from a vacuum pump (not shown in the drawings), is installed in the retained area of the laminar band.

Figure 11:
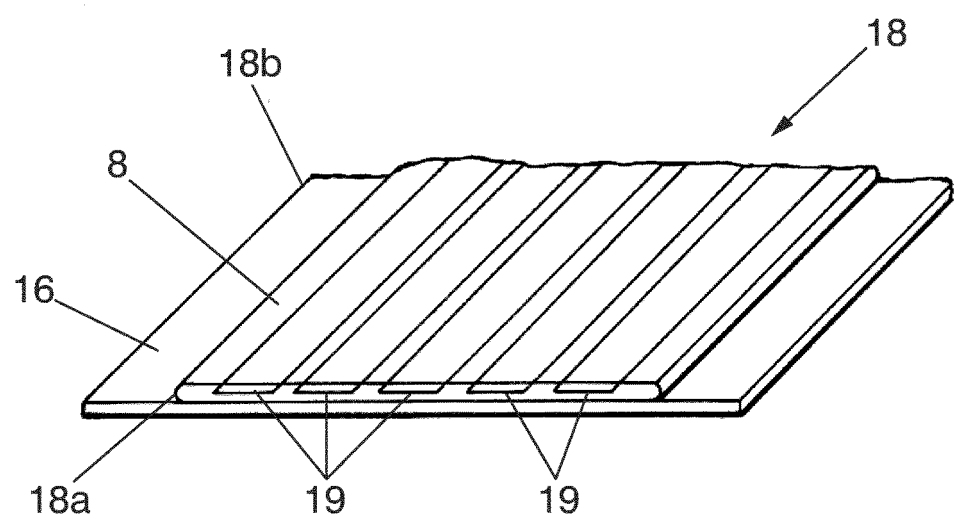
FIG. 11 is a front perspective view of an embodiment of a multipurpose cover integrating the thermal blanket and vacuum bag functions.
Figure 12:
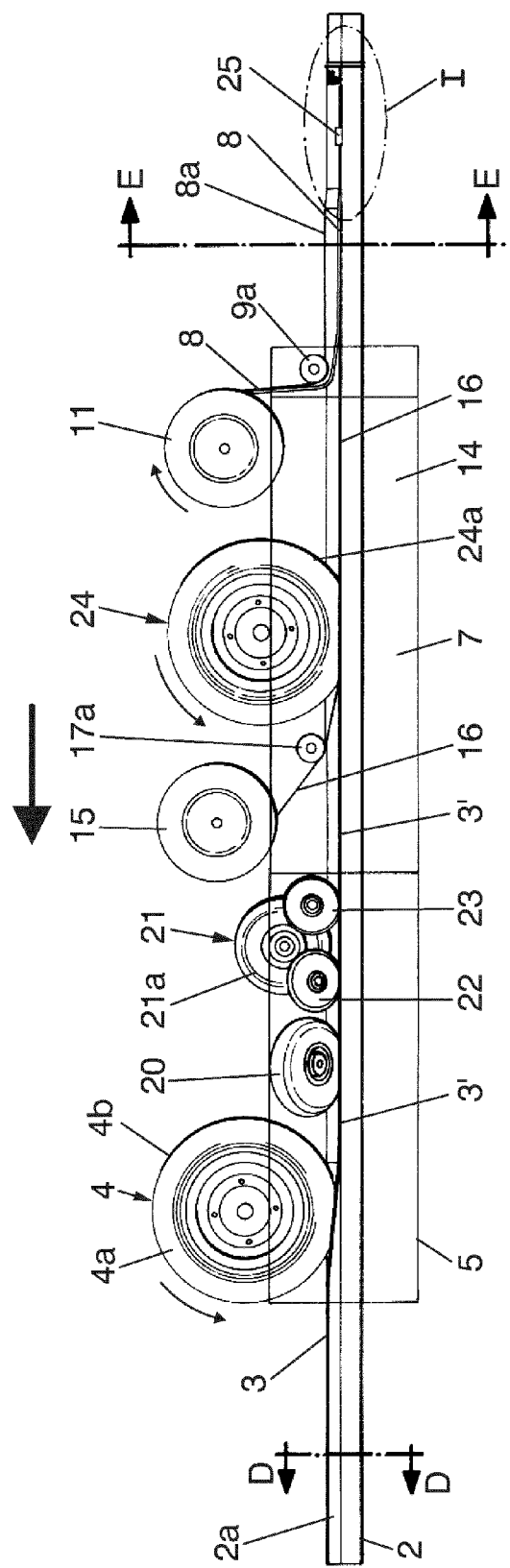
FIG. 12 is a simplified side elevational view of a third embodiment of the present invention.
Figure 13:
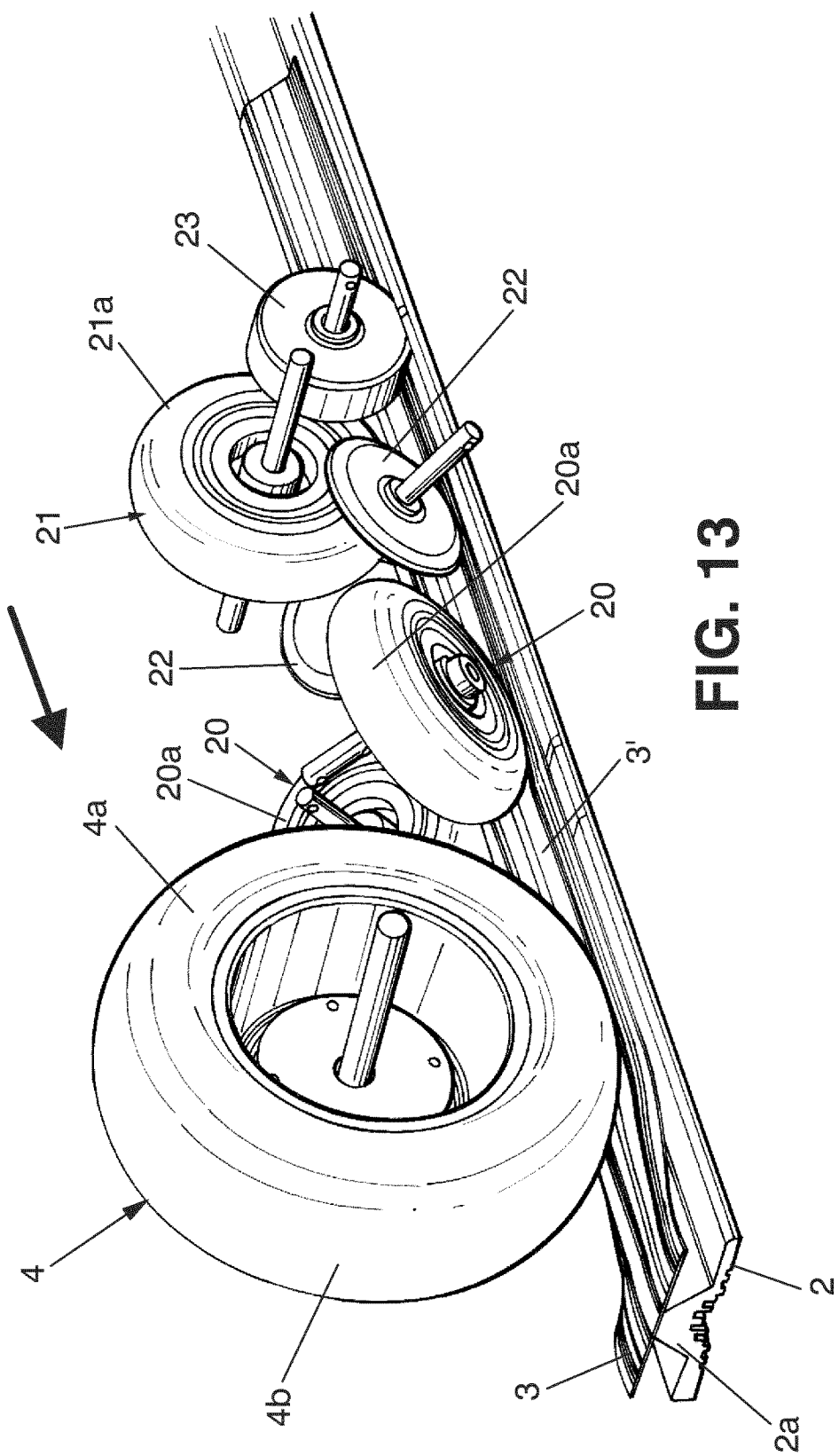
FIG. 13 is a front-side perspective view of the compacting and forming elements present in said third embodiment.
Figure 14:
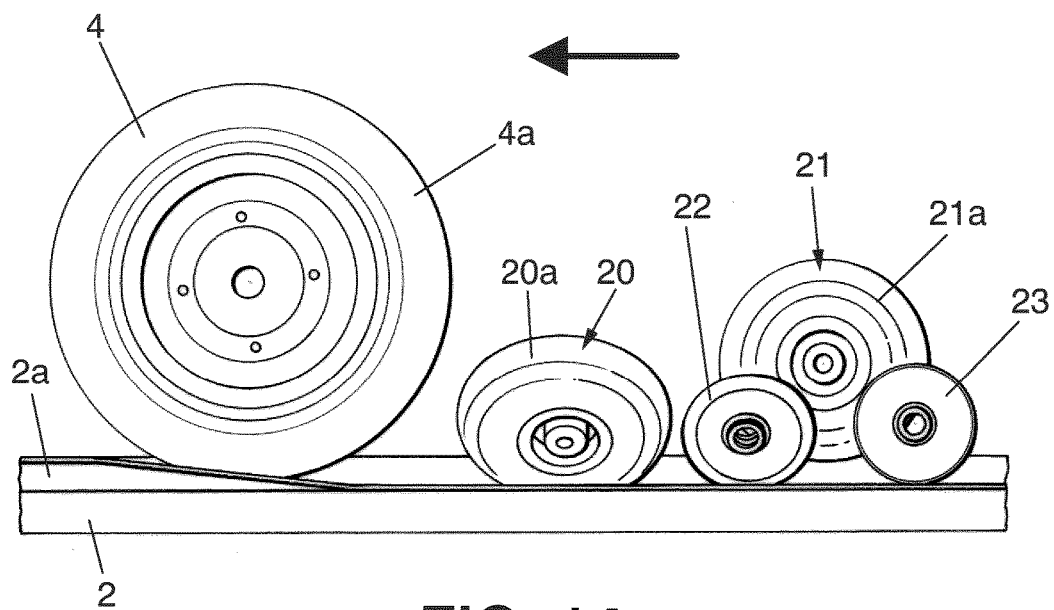
FIG. 14 is a side elevational view corresponding to FIG. 13.
Figure 15:
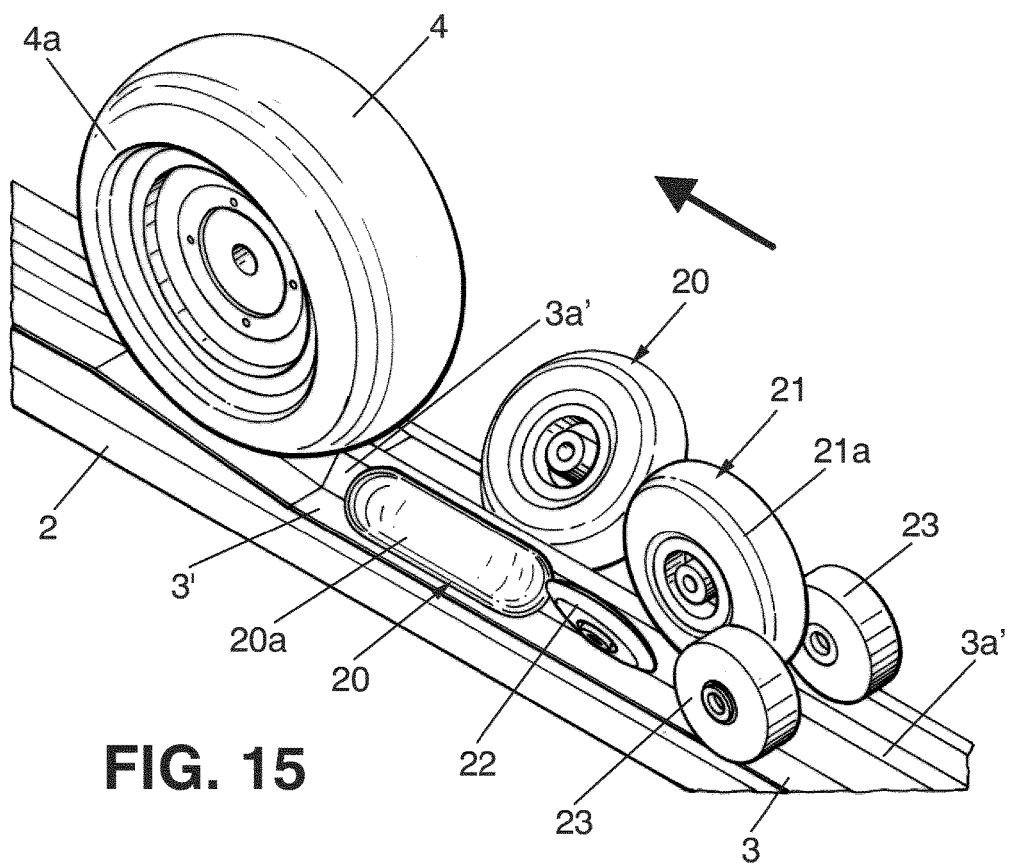
FIG. 15 is a rear-side perspective view corresponding to FIG. 13.
Figure 16:
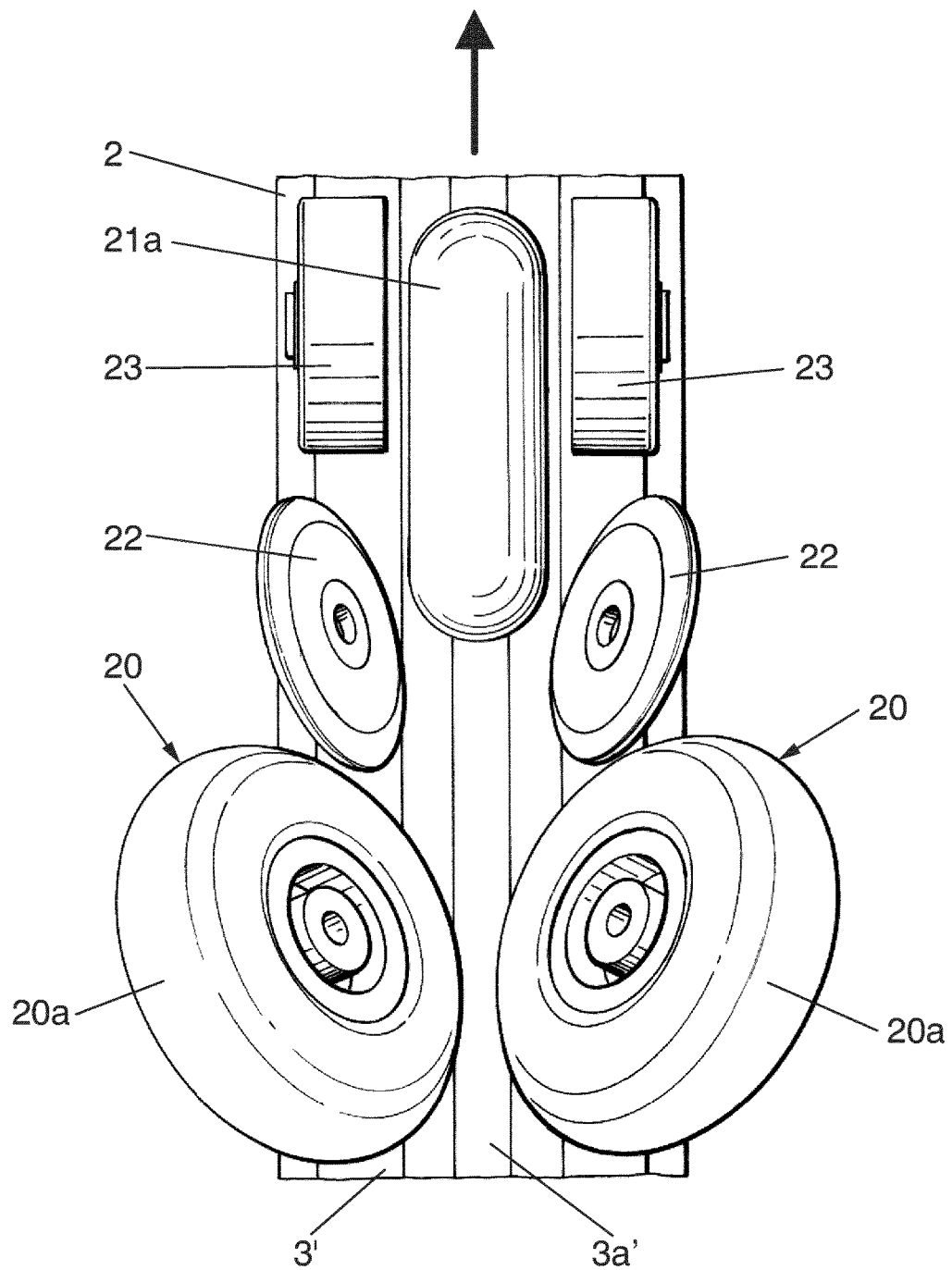
FIG. 16 is a partial upper plan view based on FIG. 13.
Figure 17:
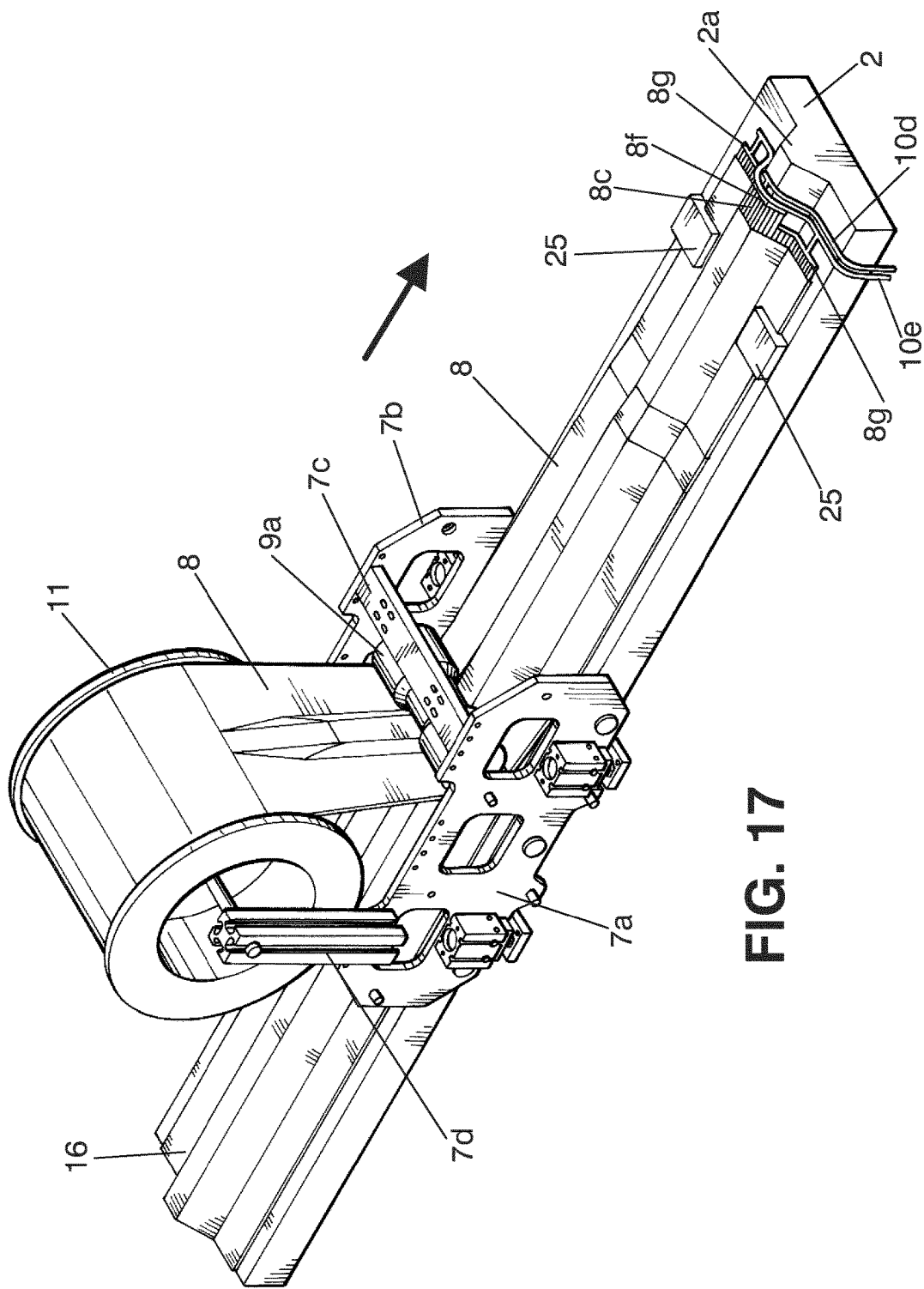
FIG. 17 is a rear-side perspective view of the positioning system of the thermal blanket present in the embodiment of FIG. 12.
Figure 18:
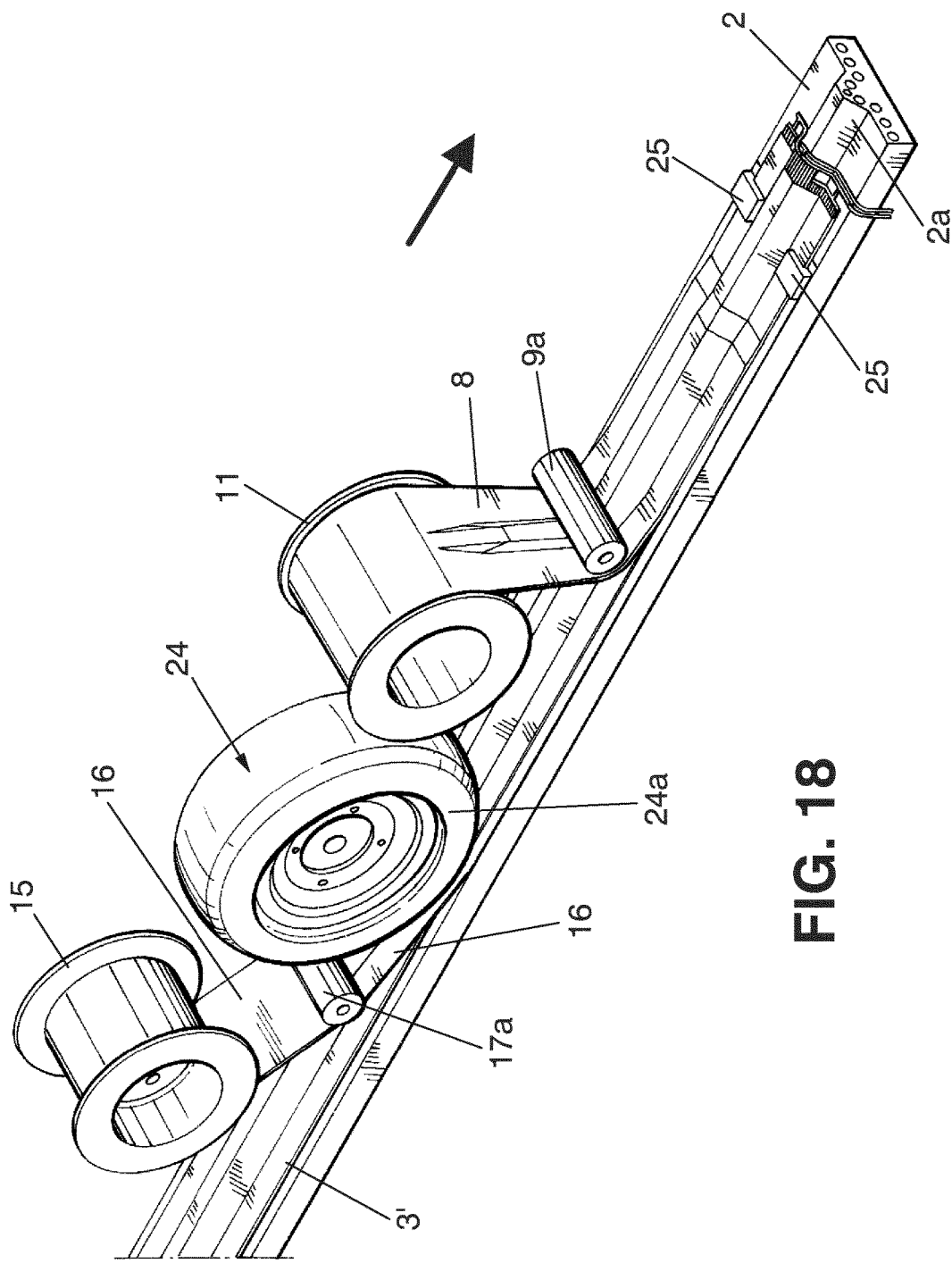
FIG. 18 is a rear-side perspective view of the placement system for placing the laminar band and of the positioning system for positioning the thermal blanket present in the embodiment of FIG. 12.
Figure 19:
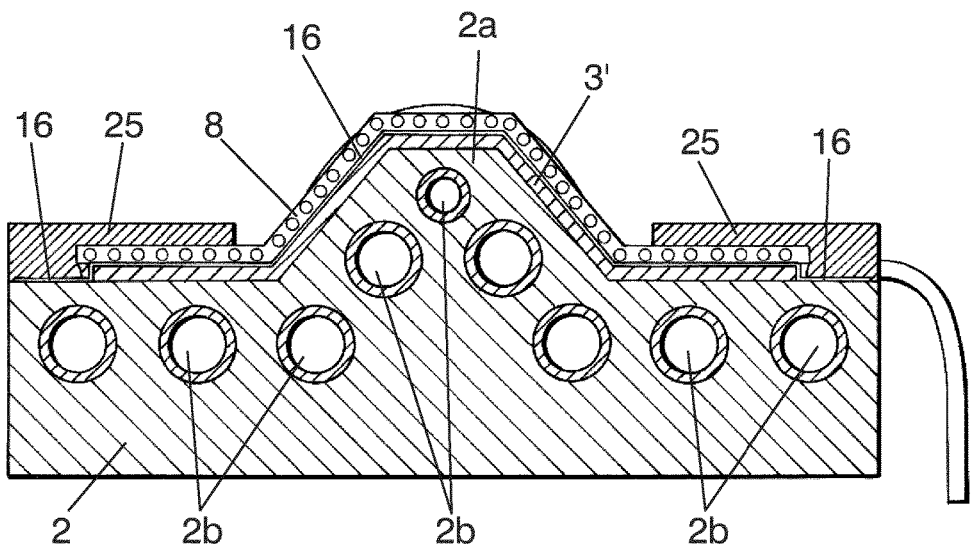
FIG. 19 is a cross-section view along line E-E shown in FIG. 12.
Figure 20:
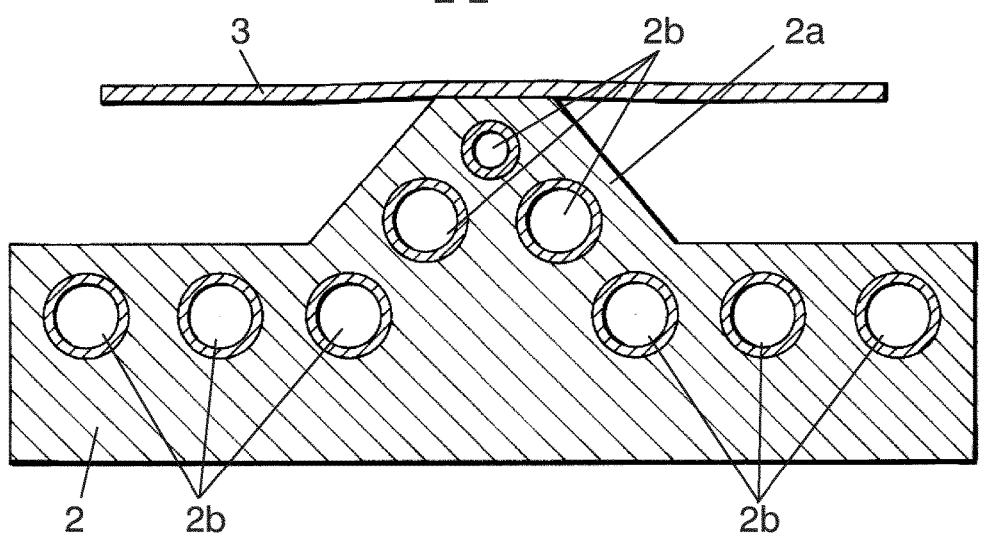
FIG. 20 is a cross-section view along line D-D shown in FIG. 12.
Figure 21:
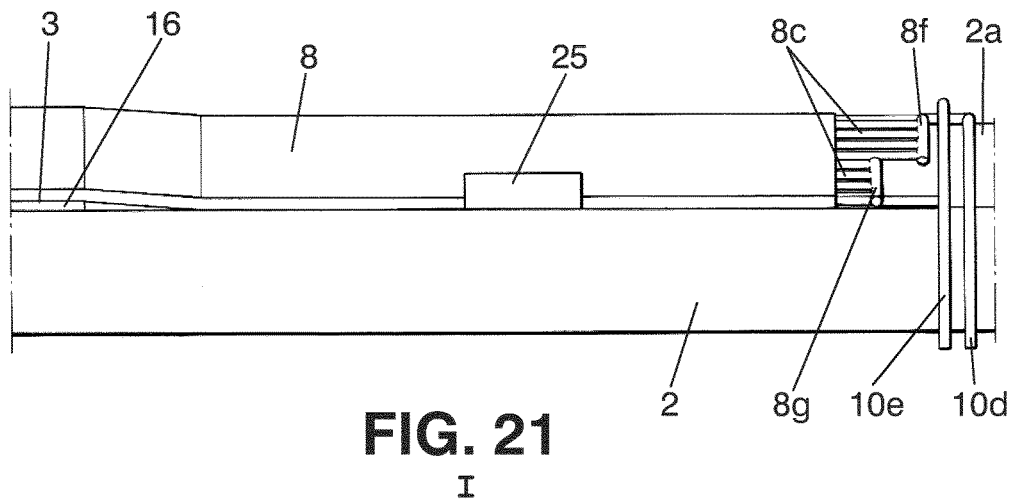
FIG. 21 is a view of detail I indicated in FIG. 12.
Figure 22:
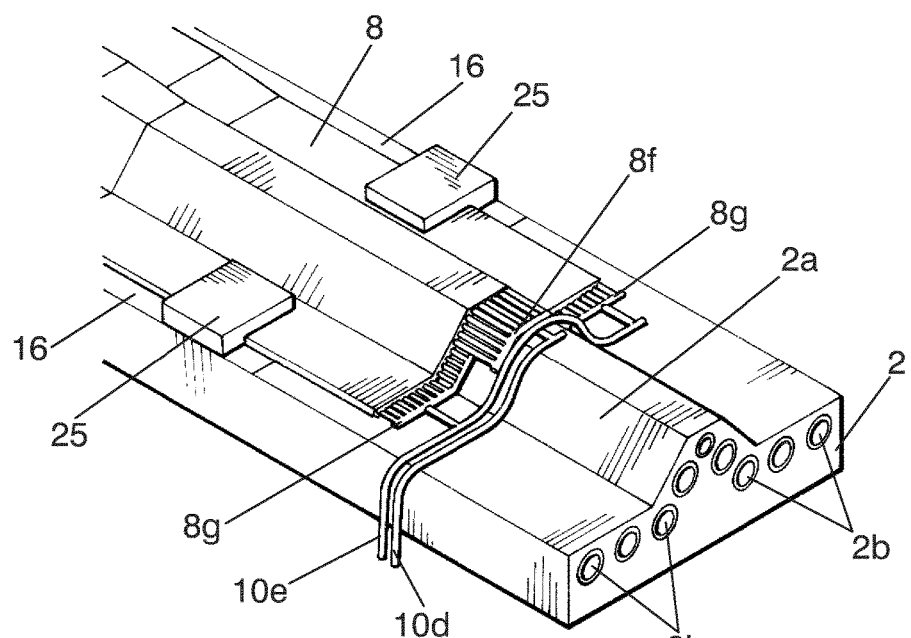
FIG. 22 is a rear-side perspective view based on FIG. 21.

FIG. 11 shows an embodiment of a multipurpose cover -18- integrating the thermal blanket -8- and the laminar band vacuum -16- in a single windable multipurpose element. Such multipurpose cover comprises a flexible longitudinal upper part -18a- constituting the thermal blanket -8- attached to a lower part -18b- in the form of a flexible film or membrane serving to constitute the vacuum bag, the multipurpose cover -18- being unwindable from a winding device similar to winding device -8- herein described in reference to the thermal bag. The upper part -18a- houses heated wires -19- for heating. The lower part 18b- is wider than the upper part -18a- assuring its optimal side sealing at the base -1- where the mandrel -2- is located.

FIGS. 12 to 22 show a third embodiment of a system for obtaining formed stacks according to the present invention.

According to this third embodiment, the system comprises a pressure rolling forming device in the form of a forming roller -4- comprising a rolling hollow forming cover -4a- with a tread, similar to the rolling forming device -4- described above in the present description in reference to the two first embodiments of the invention.

Respective side pressure rolling devices -20- comprising respective pneumatic chambers -20a- or the plurality of heavy metal particles -27- are arranged behind the forming roller -4-. The chambers -20a- rotate about respective shafts that are transverse and inclined with respect to the mandrel -2- and are arranged such that when rolling they exert pressure on the flanks of the formed stack -3'- obtained by the action of the forming roller and, therefore, compact and form them. The chambers -20a- are elastically deformable and if they are pneumatic they are filled with at least one fill fluid at a fill pressure which allows its treads to elastically adapt to the area of the respective flanks of the mandrel -2- and thus exert a predetermined pressure on the flanks of the formed stack -3'-.

Respective radius marking elastomeric rollers -22- rotating about shafts that are transverse and inclined with respect to the mandrel -2-, and intended for marking the radii in the flanks of the formed stack -3'- are provided after the side pressure rolling devices -20-. Respective leveling elastomeric rollers -23- rotating about shafts that are transverse to and coplanar with the mandrel -2-, and arranged such that they are susceptible to marking and leveling the side parts of the formed stack -3'- are located behind the marking elastomeric rollers -22-.

A securing pressure rolling device -21- comprising a securing rolling hollow cover -21a- rotating about a shaft that is transverse and coplanar with respect to the mandrel -2- and rolling over the upper part -2a- of the mandrel -2 is provided between the marking elastomeric rollers -22- and the leveling elastomeric rollers -23-. The securing pressure rolling device -21- serves to secure the formed stack -3'- during the action of the elastomeric rollers -21, 23-. The securing rolling hollow cover -21a- of the securing pressure rolling device -21- is also elastically deformable and is filled with at least one fill fluid at a fill pressure which allows the tread to elastically adapt to the upper part -2a- of the mandrel -2- and thus exert a chosen pressure on the upper face -3a'-, such that the formed stack -3'- is firmly and uniformly immobilized when the elastomeric rollers -22, 23- operate.

A winding device -15- is located behind the forming elastomeric rollers -23-, on said winding device there is wound a laminar band -16- that is placed progressively on the formed stack -3'- by the action of the placement roller -17a-, behind which there is arranged a pressure rolling placement device -24- comprising a rolling hollow placement cover -24a- elastic filled with a plurality of heavy metal particles -27- or with at least one fill fluid at a fill pressure which allows the tread to elastically adapt to the contour of the formed stack -3'- and is sized such that it is susceptible to pressing the sides of the laminar band -16- against the side parts of the mandrel -2- so that it can form, as described above in reference to FIGS. 8-10, the vacuum bag intended for preventing the spring-back effect in the formed stack -3'-.

A winding device -11- holding the thermal blanket -8-, which is placed on the formed stack -3'- by means of the positioning roller -9a-, is arranged after the pressure rolling placement device -24-. The functions of the thermal blanket -8- are the same as those described above in this description in reference to the first and second embodiment of the system according to the present invention. The thermal fluid supplied through the feed duct -10d- enters the longitudinal tubes -8c-through the inlet manifold -8f- and exits them through the outlet manifolds -8g- which are in turn connected to the outlet duct -10e- (FIGS. 17, 19, 21, 22).

The pressure rolling forming device -4-, the side pressure rolling devices -20-, the elastomeric rollers -21, 23-, of the securing pressure rolling device -22-, the winding device -15- of the laminar band -16-, the placement roller -17a-, the pressure rolling placement device -24-, the winding device -11- and the positioning roller -9a- are assembled in a forming carriage -5- with it carriage structures -7, 14- which have a configuration similar to forming carriage -5- and to the supporting structures -7, 14- described above in the present description, and in their forward advance move longitudinally along the mandrel -2- in the direction of the arrows shown in FIGS. 12-18.

As can be seen in FIGS. 17-19, 21 and 22, in the third embodiment of the system, the end free parts of the laminar band -16- and of the thermal blanket -8- are trapped at their side edges between respective securing plates -25- and the side surfaces of the mandrel -2.

Figure 23:
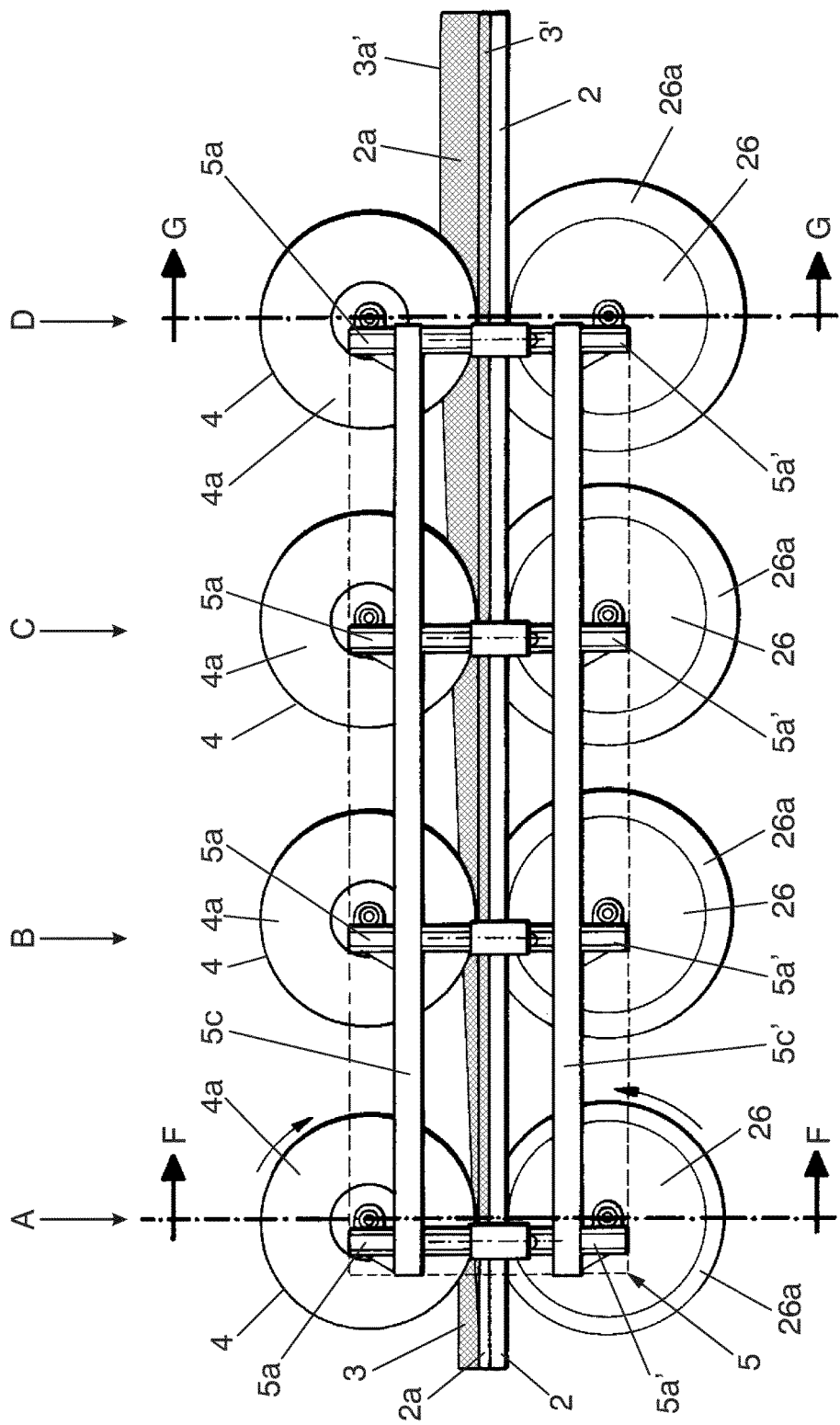
FIG. 23 is a simplified side elevational view of a fourth embodiment of the system of the present invention.
Figure 24:
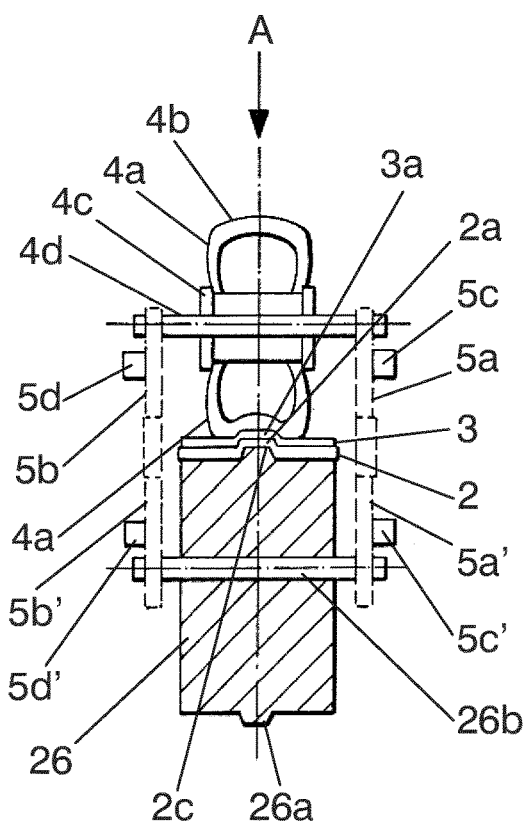
FIG. 24 is a cross-section view along line F-F shown in FIG. 23.
Figure 25:
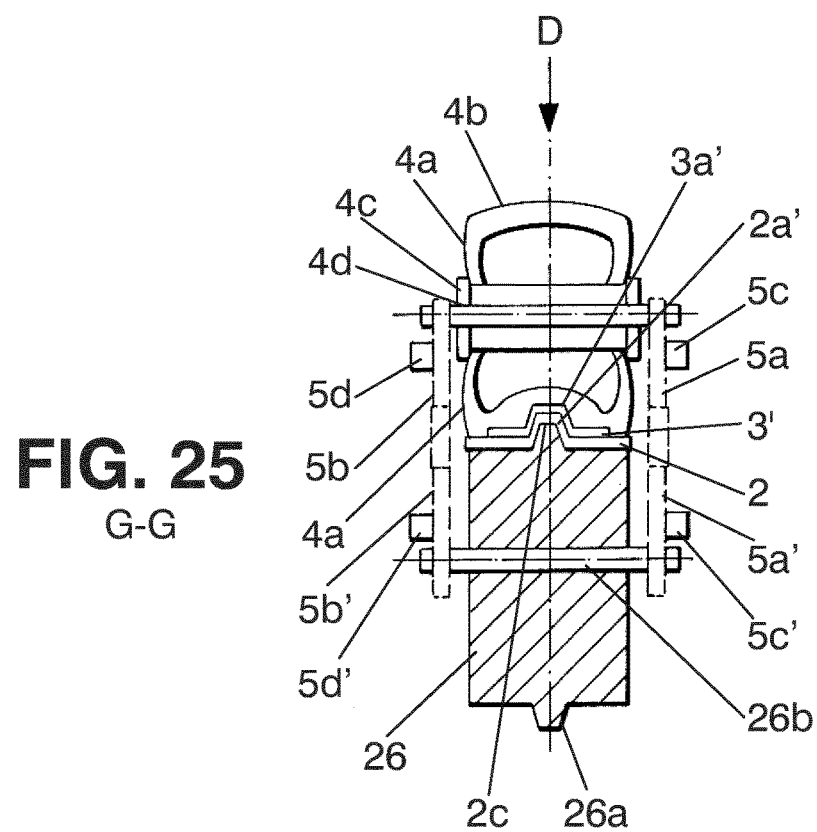
FIG. 25 is a cross-section view along line G-G shown in FIG. 23.

FIGS. 23 to 25 show a fourth embodiment in which the supporting device -5- is stationary, and the mandrel element -2- is longitudinally movable with respect to the supporting device -5-, and in which the system comprises an initial roller train -A-, two intermediate roller trains -B, C- and an end roller train -D-.

Each roller train comprises an upper pressure rolling forming device in the form of a pressure forming roller -4- and a lower rigid roller -26-. The pressure rolling forming device -4- comprises a rolling hollow forming cover -4a- such as that described above in the present description (filled with a fluid or with heavy metal particles -27-, assembled in a rim -4c- which rotates about a rotating shaft -4d-, whereas the lower rigid roller -26- comprises a perimetric rib -26a- and rotates about a rotating shaft -26b-. The rotating shafts -4d, 26b- are coupled respectively between a pair of upper vertical supporting profiles -5a, 5b- and a pair of lower vertical supporting profiles -5a', 5b'- and are height-adjustable to contribute to regulating the pressure exerted by the pressure forming roller -4- on the stack of composite material -3-. The vertical supporting profiles -5a, 5b- of the pressure forming rollers -4- are connected with one another by respective upper horizontal attachment profiles -5c, 5d-, whereas the lower vertical supporting profiles -5a', 5b'- of the lower rigid rollers -26- are connected to one another by respective lower horizontal attachment profiles -5c', 5d'-.

The mandrel element -2- is connected to driving means [not shown in Figures] to drive the stack of composite material -3- deposited on the mandrel element -2- between the treads -4b- of the upper pressure forming rollers -4- and the lower rigid rollers -26, 26'-. The mandrel element -2- comprises a longitudinal upper part -2a- with an initial sector [on the left in FIG. 23] and an end sector [on the right of FIG. 23], the initial sector having less height than the end sector. Therefore, due to the increasing height of the upper part -2a- of the mandrel element -2-, an upper part -3a- of the stack of composite material -3- increasing in height until reaching the desired shape of the upper face -3a'- of the formed stack -3- is gradually formed by the action of the pressure rolling rollers -4-. On its lower face, the mandrel element -2- is provided with longitudinal guiding means in the form of a longitudinal track -2c- in which perimetric ribs are guided.

Figure 26:
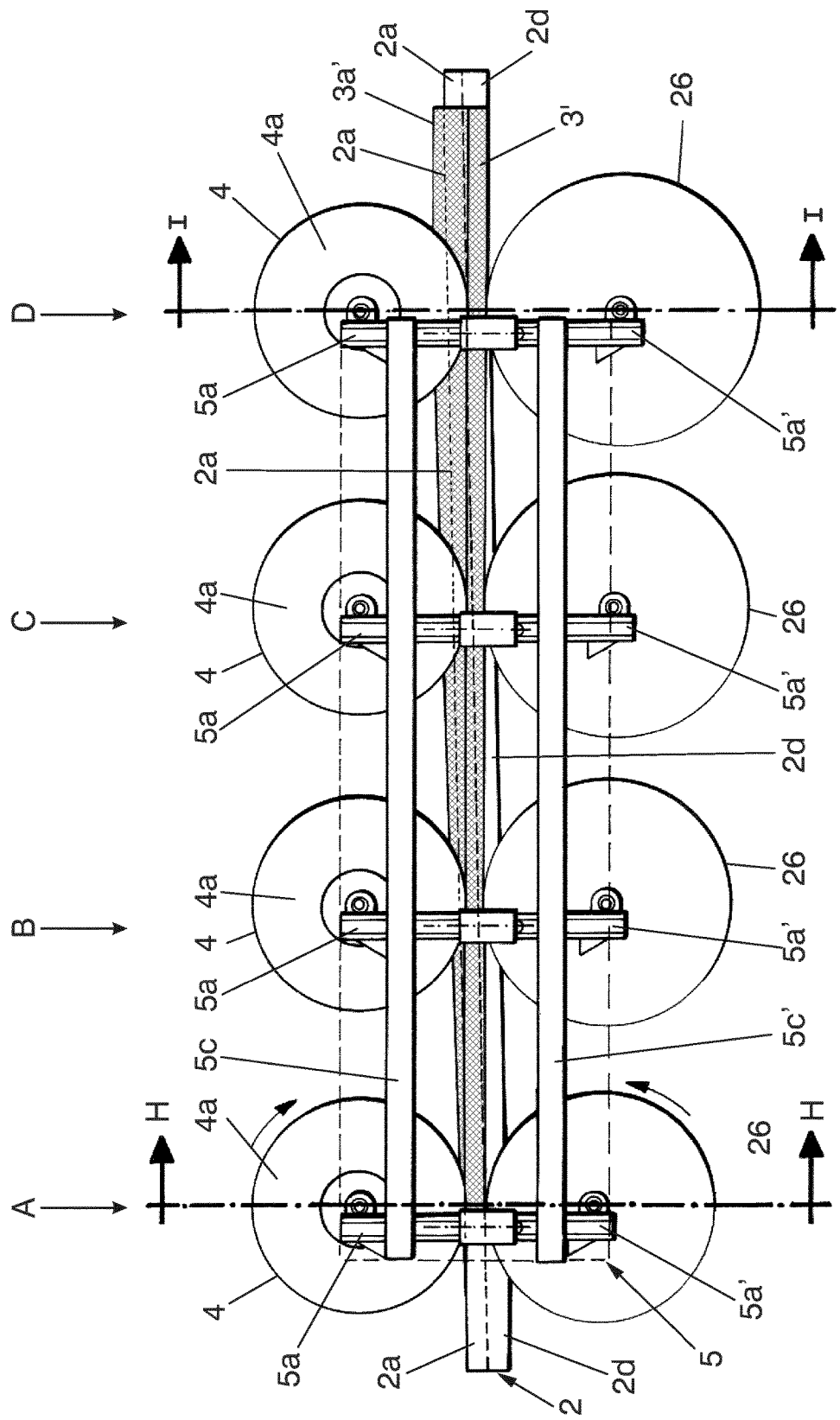
FIG. 26 is a simplified side elevational view of a fourth embodiment of the system of the present invention.
Figure 27:
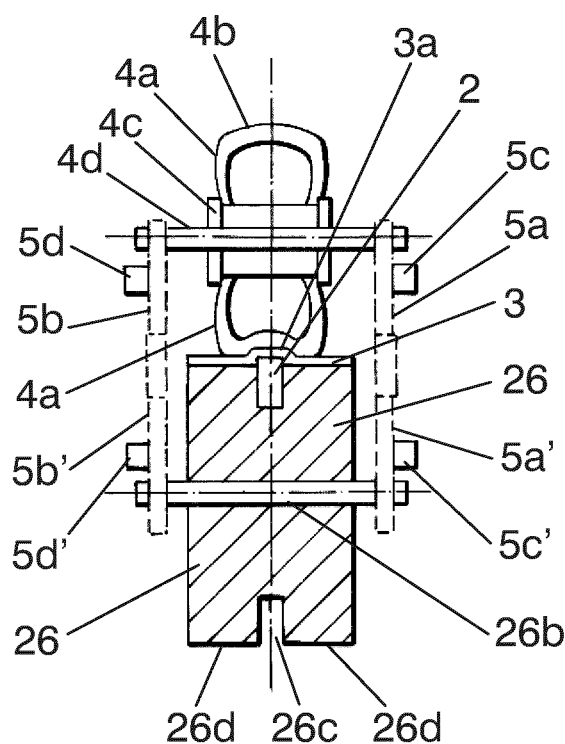
FIG. 27 is a cross-section view along line F-F shown in FIG. 26.
Figure 28:
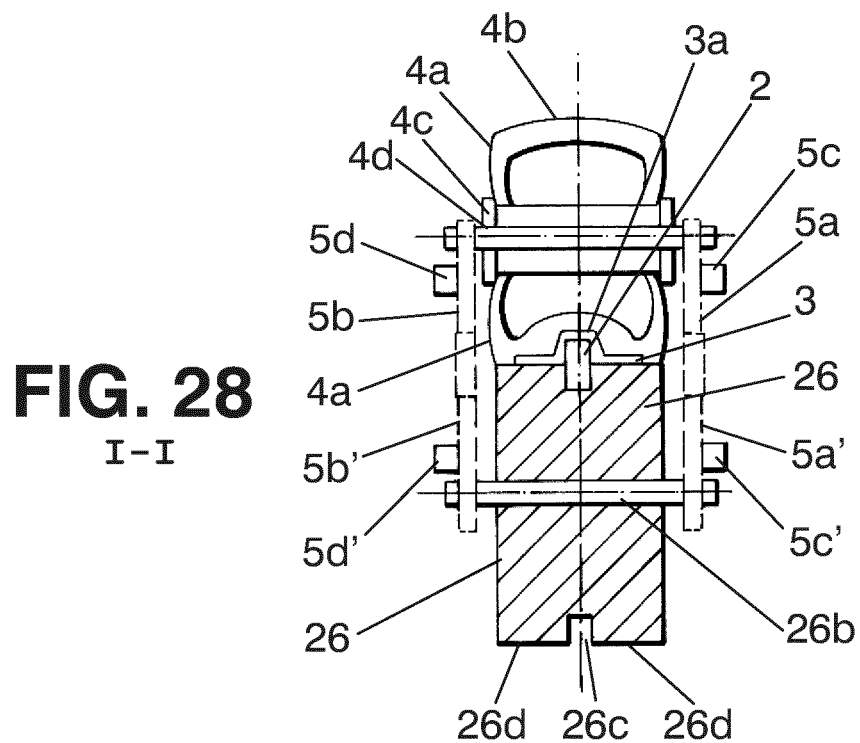
FIG. 28 is a cross-section view along line G-G shown in FIG. 26.

FIGS. 26 to 28 show a fifth embodiment in which the supporting device -5- is also stationary, and the mandrel element -2- is also longitudinally movable with respect to the supporting device -5-, and in which the system also comprises an initial roller train -A-, two intermediate roller trains -B, C- and an end roller train -D-.

Each roller train comprises an upper pressure rolling forming device in the form of a pressure forming roller -4- and a lower rigid roller -26-. The pressure rolling forming device -4- comprises a rolling hollow forming cover -4a- like that described above in the present description, assembled in a rim -4c- which rotates about a rotating shaft -4d-, whereas the lower rigid roller -26- comprises a circumferential groove -26c- demarcated between respective side contact surfaces -26d-, and rotates about a rotating shaft -26b-. The depth of the circumferential grooves -26c- in the lower rigid rollers -26- progressively decreases from the initial roller train -A- towards the end roller train -D- such that the depth of the groove -26c- of the lower rigid roller -26- of the initial roller train -A- is greater than the depth of the groove -26c- of the lower rigid roller -26- of the first intermediate roller train -B-, the depth of the groove -26c- of the lower rigid roller -26- of the first roller train intermediate -B- is in turn less than that of the groove -26c- of the lower rigid roller -26- of the second intermediate roller train -C-, and the depth of the groove -26c- of the lower rigid roller -26- of the second intermediate roller train -C- is in turn less than that of the groove -26c- of the lower rigid roller -26- of the end roller train -D-.

The rotating shafts -4d, 26b- are coupled respectively between a pair of upper vertical supporting profiles -5a, 5b- and a pair of lower vertical supporting profiles -5a', 5b'- and are height-adjustable to contribute to regulating the pressure exerted by the pressure forming roller -4- on the stack of composite material -3-. The vertical supporting profiles -5a, 5b- of the pressure forming rollers -4- are connected with one another by respective upper horizontal attachment profiles -5c, 5d-, whereas the lower vertical supporting profiles -5a', 5b'- of the lower rigid rollers -26- are connected to one another by respective lower horizontal attachment profiles -5c', 5d'-.

In the fifth embodiment shown in FIGS. 26 to 28, the mandrel element is a guiding element in the form of a flat bar -2- of height uniform with a lower part -2d- guided in the circumferential grooves -26c- of the lower rigid rollers -26- and an upper part -2a- protruding from the circumferential grooves -26c. The mandrel element -2- is connected to driving means [not shown in Figures] to drive the stack of composite material -3- deposited on the mandrel element -2-, between the treads -4b- of the upper pressure forming rollers -4- and the lower rigid rollers -26, 26'-.

Due to the decrease in depth of the grooves -26c- of the respective lower rigid rollers -26-, the upper part -2a- of the guiding element -2- protrudes more each time from the circumferential grooves -26c- of the respective lower rigid rollers -26- such that, when the rolling hollow forming covers -4- roll over the stack of composite material -3- arranged on the guiding element -2- and the side surfaces -26d- of the respective rigid rollers -26-, the upper part -2a- of the guiding element -2- enters further into the stack of composite material -3- such that a longitudinal head progressively increasing in height protruding from the upper face of the stack of composite material -3- is formed.

In view of this description and set of drawings, the person skilled in the art will understand that the embodiments of the invention that have been described can be combined in many ways within the object of the invention. The invention has been described according to several preferred embodiments thereof, but it will be evident for the person skilled in the art that a number of variations can be introduced in said preferred embodiments without exceeding the object of the claimed invention.

The invention claimed is:

1. A system for forming stacks of composite material comprising:
   a base with at least one longitudinal mandrel element on its upper face, comprising a shape to be given to a stack of composite material which is arranged on the mandrel element for obtaining a shaped and formed stack of composite material; and
   at least one pressure rolling forming device assembled in a supporting device and configured to be placed in at least one position in which it rolls over an unformed stack of composite material thereby pressing the composite material against the mandrel element for simultaneously forming the stack of composite material and shaping the stack of composite material, wherein the pressure rolling forming device comprises a hollow forming cover made of flexible material with a tread, and the hollow forming cover includes air at a fill pressure which allows the tread to elastically adapt to at least part of the mandrel element and exert a controlled pressure on the stack of composite material against the mandrel,
   wherein the hollow forming cover includes a plurality of particles which allow the tread to elastically adapt to at least part of the mandrel element and exert a controlled pressure on the stack of composite material, wherein said particles are sufficiently heavy such that particles act gravitationally on the hollow forming cover and are deposited in the area to be formed, wherein the particles cause the effect of allowing the cover to form the stack as a result of the pressure generated by the actual weight of respective particles.

2. A system according claim 1, wherein the pressure rolling forming device is assembled in a vertically adjustable mechanism for regulating the pressure exerted by the pressure rolling forming device on the stack of composite material, the vertically adjustable mechanism being assembled in the supporting device.

3. A system according to claim 1, further comprising at least one pair of side pressure rolling devices assembled on transversely opposite sides of the supporting device by means of respective rotating shafts transverse to the mandrel element, such that they roll and exert pressure respectively on respective flanks defined between the upper part and respective side parts of the formed stack by the pressure rolling forming device before the pair of side pressure devices.

4. A system according to claim 3, wherein at least one of the side pressure rolling devices comprises a side rolling hollow forming cover elastically deformable provided with a tread and filled with at least one fill fluid which allows the tread to elastically adapt to the corresponding flank of the mandrel element and exert a predetermined pressure on the flank of the formed stack.

5. A system according to claim 1, further comprising at least one pair of solid marking rollers assembled on transversely opposite sides of the supporting device by means of respective axes of rotation that are transverse and inclined with respect to the mandrel element such that they roll and exert pressure in respective curved areas of the formed stack for marking longitudinal radii joining changes in plane of the part to be formed.

6. A system according to claim 1, further comprising at least one pair of solid leveling rollers assembled on transversely opposite sides of the supporting device by means of respective rotating shafts that are transverse and coplanar with respect to the mandrel element such that they roll and exert pressure in respective side parts of the formed stack.

7. A system according to claim 1, further comprising at least one compaction system comprising at least one extensible cover and extending means to deposit the extensible cover on at least one part of the formed stack to compact the formed stack arranged in the mandrel element, the compaction system being selected from a thermal treatment system in which the extensible cover is a thermal bag, a vacuum bag compaction system in which the extensible cover is a laminar band, and a combined compaction system in which the extensible cover is a multipurpose cover integrating the thermal bag and the laminar band.

8. A system according to claim 7, wherein the extensible cover is a thermal blanket comprising a lower face substantially capable of adapting to the contour of the formed stack arranged on the mandrel element and an upper face, and where said thermal blanket is connectable to a heat exchange fluid circuit and comprises at least one fluid inlet and at least one fluid outlet connectable to the heat exchange fluid circuit, and at least one inner chamber located therein, connected to the heat exchange fluid circuit through the fluid inlet and the fluid outlet.

9. A system according to claim 7, wherein the laminar band of the vacuum compaction system is hermetically sealable along its sides at the base of the mandrel element, and where the system comprises a pressure rolling placement device comprising an elastic rolling hollow placement cover with a tread and filled with at least one fill fluid at a fill pressure which allows the tread to elastically adapt to the contour of the formed stack and is sized such that it is susceptible to pressing the sides of the laminar band against the side parts of the base of the mandrel element to assure the hermetic sealing of the laminar band.

10. A system according to claim 7, wherein the multipurpose cover of the combined compaction system comprises a first longitudinal part serving as a thermal blanket attached to a second longitudinal part serving as a laminar band hermetically sealable along its sides at the base of the mandrel element.

11. A system according to claim 1, wherein the supporting device is stationary, and the mandrel element is longitudinally movable with respect to the supporting device.

12. A system according to claims 11, further comprising a plurality of roller trains including an initial roller train and an end roller train, wherein each roller train comprises an upper pressure rolling forming device and a lower end rigid roller, and the mandrel element is connected to driving means to drive the stack of composite material between the upper pressure rolling forming devices and the lower rigid rollers.

13. A system according to claim 12, wherein
   the lower rigid rollers comprise respective circumferential grooves located between side contact surfaces, the mandrel element is a guiding element in the form of a flat bar with a guided lower part in the circumferential grooves and an upper part protruding from the circumferential grooves, the upper part of the guiding element comprises an initial sector and an end sector, and
   the guiding element protrudes more from the circumferential groove of the lower rigid roller of the end roller train than from the circumferential groove of the lower rigid roller of the end roller train, such that when the hollow forming covers roll over the stack of composite material arranged on the guiding element and the side contact surfaces of the lower rigid rollers, the upper part of the guiding element is susceptible to forming a longitudinal head progressively increasing in height in the upper face of the stack of composite material.

14. A system according to claim 8, wherein the laminar band of the vacuum compaction system is hermetically sealable along its sides at the base of the mandrel element, and where the system comprises a pressure rolling placement device comprising an elastic rolling hollow placement cover with a tread and filled with at least one fill fluid at a fill pressure which allows the tread to elastically adapt to the contour of the formed stack and is sized such that it is susceptible to pressing the sides of the laminar band against the side parts of the base of the mandrel element to assure the hermetic sealing of the laminar band.

15. A system according to claim 8, wherein the multipurpose cover of the combined compaction system comprises a first longitudinal part serving as a thermal blanket attached to a second longitudinal part serving as a laminar band hermetically sealable along its sides at the base of the mandrel element.

16. A system according to claim 9, wherein the multipurpose cover of the combined compaction system comprises a first longitudinal part serving as a thermal blanket attached to a second longitudinal part serving as a laminar band hermetically sealable along its sides at the base of the mandrel element.

* * * * *